US008916259B2

(12) United States Patent
Blackburn et al.

(10) Patent No.: US 8,916,259 B2
(45) Date of Patent: Dec. 23, 2014

(54) MULTILAYER FILMS FOR INSERT MOLD DECORATION, METHODS FOR MAKING THE SAME, AND ARTICLES MADE THEREFROM

(75) Inventors: Sapna Kirk Blackburn, Mount Vernon, IN (US); David D. Clinnin, Newburgh, IN (US); Johannes Martinus Dina Goossens, Bergen op Zoom (NL); Hendrik Theodorus van de Grampel, Mijnsheerenland (NL); Jan-Pleun Lens, Rotterdam (NL); Lina Prada, Breda (NL); Sandeep Tripathi, Midland Park, NJ (US); André van Zyl, Roosendaal (NL)

(73) Assignee: Sabic Global Technologies B.V. (NL)

( * ) Notice: Subject to any disclaimer, the term of this patent is extended or adjusted under 35 U.S.C. 154(b) by 1573 days.

(21) Appl. No.: 12/338,462

(22) Filed: Dec. 18, 2008

(65) Prior Publication Data

US 2010/0159211 A1 Jun. 24, 2010

(51) Int. Cl.
*B32B 3/10* (2006.01)
*B32B 27/06* (2006.01)
*B28B 1/24* (2006.01)
*B29C 47/06* (2006.01)
*B29C 47/00* (2006.01)
*B32B 27/36* (2006.01)

(52) U.S. Cl.
CPC .......... *B32B 27/36* (2013.01); *B29C 47/065* (2013.01); *B29C 47/0064* (2013.01); *B29C 47/0004* (2013.01); *B29C 47/0066* (2013.01); *B29C 47/0021* (2013.01); *B29C 47/0011* (2013.01)
USPC ...... 428/195.1; 428/412; 428/220; 264/297.2

(58) Field of Classification Search
USPC .................. 428/195.1, 412, 220; 264/297.2
See application file for complete search history.

(56) References Cited

U.S. PATENT DOCUMENTS

| 6,117,384 | A | 9/2000 | Laurin et al. |
| 6,458,913 | B1 | 10/2002 | Honigfort et al. |
| 6,537,636 | B1 * | 3/2003 | Wisnudel et al. ............ 428/64.1 |
| 6,657,038 | B1 * | 12/2003 | Lens et al. .................... 528/196 |
| 6,682,805 | B1 | 1/2004 | Lilly |
| 7,277,230 | B2 | 10/2007 | Srinivasan et al. |
| 7,321,014 | B2 | 1/2008 | Glasgow et al. |
| 7,700,696 | B2 | 4/2010 | van de Grampel et al. |
| 7,834,125 | B2 | 11/2010 | Brack et al. |
| 2008/0004379 | A1 | 1/2008 | Berndsen et al. |
| 2008/0033108 | A1 | 2/2008 | Kung et al. |
| 2008/0182094 | A1 * | 7/2008 | Meyer et al. .................. 428/220 |

FOREIGN PATENT DOCUMENTS

| EP | 2199076 A1 | 6/2010 |
| WO | 2007024456 A1 | 1/2007 |
| WO | 2008127938 A1 | 10/2008 |
| WO | 2008155694 A1 | 12/2008 |

OTHER PUBLICATIONS

European Search Report for Application No. 09179590.6; Received Apr. 6, 2010; Mailing Date Apr. 1, 2010; 8 Pages.
ASTM Designation: D 1003-00, "Standard Test Method for Haze and Luminous Transmittance of Transparent Plastics," pp. 1-6 (2000).
ASTM Designation: D 1004-03, "Standard Test Method for Tear Resistance (Graves Tear) of Plastic Film and Sheeting," pp. 1-4 (2003).
ASTM Designation: D 1938-06, "Standard Test Method for Tear-Propagation Resistance (Trouser Tear) of Plastic Film and thin Sheeting by a Single-Tear Method," pp. 1-4 (2006).
ASTM Designation: D 3418-03, "Standard Test Method for Transition Temperatures and Enthalpies of Fusion and Crystallization of Polymers by differential Scanning Calorimetry," pp. 1-7 (2003).
ASTM Designation: D E 313-00, "Standard Practice for Calculation Yellowness and Whiteness Indices from Instrumentally Measured Color Coordinates," pp. 1-5 (2000).
International Standard: ISO 180, "Plastics-Determination of Izod Impact Strength," pp. 1-10 (2000).
International Standard: ISO 527, Parts 1-5, "Plastics-Determination of Properties," pp. 201-252 (1993-1997).
International Standard: ISO 1133, "Plastics-Determination of the Melt Mass-Flow Rate (MFR) and the Melt Volume-Flow Rate (MVR) of Thermoplastics," pp. 1-16 (2005).
International Standard: ISO 1518, "Paints and Varnishes-Scratch Test," pp. 1-7 (1992).
International Standard: ISO 6603-2, "Plastics-Determination of Puncture Impact Behaviour of Rigid Plastics," pp. 1-23 (2000).
International Standard: ISO 11357-7, "Differential Scanning Calorimetry (DSC)," pp. 1-11 (2002).

* cited by examiner

*Primary Examiner* — Aaron Austin
*Assistant Examiner* — Tahseen N Khan
(74) *Attorney, Agent, or Firm* — Cantor Colburn LLP

(57) ABSTRACT

A multilayer thermoplastic film having polycarbonate layers is disclosed, in which a first layer comprises a first polycarbonate that comprises repeat units derived from one or more of a monoaryl monomer (II) and/or (III), and a diaryl monomer (IV) as defined herein. A second layer, adjacent to the first layer and coextruded therewith, comprises another polycarbonate that is not the same as a polycarbonate in the first layer. The first layer provides improved properties, for example hardness, impact, and/or scratch resistance.

23 Claims, No Drawings

MULTILAYER FILMS FOR INSERT MOLD DECORATION, METHODS FOR MAKING THE SAME, AND ARTICLES MADE THEREFROM

BACKGROUND OF THE INVENTION

This disclosure relates to compositions for the manufacture of multilayer thermoplastic films, methods for the manufacture of the multilayer thermoplastic films, and articles made with the multilayer thermoplastic films. The multilayer thermoplastic films are especially useful for in-mold decoration.

Decorating a three-dimensional article via in-mold decoration (IMD), also known as insert mold decoration, involves inserting a decorative film (often referred to as a substrate) into a molding tool; and injecting a molten base polymer behind it in an injection molding cycle. The decorative film is bonded with or encapsulated by the molten base polymer, to provide an injection molded article or finished part having the desired decoration after the injection molding cycle is complete. Thus, the decorative film becomes a permanent fixture of the finished part. The decoration for the finished part can either be exposed to the environment as "first surface decoration" and/or encapsulated between the substrate of the decorative film and the injected material as "second surface decoration."

The term "decorative film" as used herein refers to a film having surface printing or other marking of an aesthetic, functional, and/or informational nature including, for example, symbols, logos, designs, colored regions, and/or alphanumeric characters. When printed with ink, formable and high temperature inks are generally used. The decorative film can also act as an aesthetic effect carrier and/or as a protective layer for the base polymer, the ink used to mark the film, or both. When used to manufacture a three-dimensional article, decorative films are often thermoformed on a tool into a three-dimensional shape that corresponds to the three-dimensional shape desired for the injection molded article.

Processes for making decorative film are disclosed in U.S. Pat. No. 6,117,384 to Laurin et al., which describes a process wherein a colored decorated film is incorporated with a molten polymer injected behind the film to produce a permanently bonded three-dimensional piece. U.S. Pat. No. 6,458,913 to Honigfort and U.S. Pat. No. 6,682,805 to Lilly also describe insert mold decorative films and articles. Lilly describes a multilayer thermoplastic printable film comprising a thermoplastic film substrate having laminated to one surface a fluoride polymer in order to improve the birefringence and other properties of the film, including chemical resistance.

Polycarbonates are especially useful thermoplastic materials for the manufacture of decorative films, based at least in part on their hardness and processability. Polycarbonate films can also be manufactured to have high transparency, which is advantageous in decorative films.

Despite their wide use, there remains a perceived need in the art for improved polycarbonate compositions for use in the manufacture of decorative films, as well as decorative films with improved properties. For example, there remains a need in the art for polycarbonate compositions and decorative films where the exposed surface of the decorative film has improved scratch and/or chemical resistance.

SUMMARY OF INVENTION

A multilayer thermoplastic film comprises a first layer comprising a first polycarbonate that comprises repeat units derived from monomers (II), (III), and (IV), wherein monomer (II) is a first dihydroxy compound of the formula:

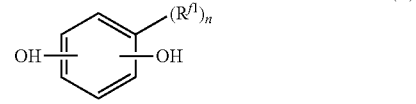

(II)

wherein n is 0 to 4, and $R^{f1}$ is a halogen, a $C_{1-10}$ hydrocarbon group, or a $C_{1-10}$ halogen-substituted hydrocarbon group; monomer (III) is a second dihydroxy compound not the same as monomer (II) and of the formula:

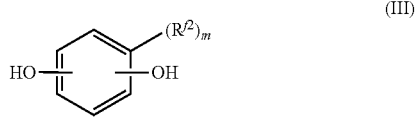

(III)

wherein m is 1 to 4, and $R^{f2}$ is a halogen, a $C_{1-10}$ hydrocarbon group, or a $C_{1-10}$ halogen-substituted hydrocarbon group; and monomer (IV) is a third dihydroxy compound of the formula:

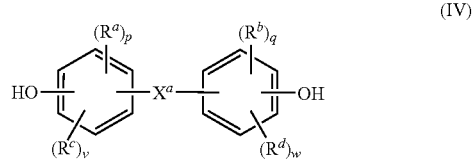

(IV)

wherein $R^a$ and $R^b$ are each independently a halogen or $C_{1-12}$ alkyl group; $R^c$ and $R^d$ each independently represent a $C_1$-$C_{12}$ alkyl; p and q are each independently integers of 0 to 4; v and w are each independently integers 0 to 2; and $X^a$ is a single bond or a bridging group; wherein the sum of the mole percent of the repeat units derived from monomers (II) and (III) is greater than or equal to 30 mole percent, based on the total moles of the repeat units derived from monomers (II), (III), and (IV) in the first polycarbonate; the mole percent of the repeat units derived from monomer (IV) is 5 to 70 mole percent, based on the total moles the repeat units derived from monomers (II), (III), and (IV); and the total wt. % of the repeat units derived from monomers (II), (III), and (IV) is greater than or equal to 80 wt. % of the first polycarbonate; and a second layer adjacent to the first layer, wherein the second layer comprises a second polycarbonate that is not the same as the first polycarbonate in the first layer.

In another embodiment, a multilayer thermoplastic film comprises a first polycarbonate and an additional polycarbonate that is not the same as the first polycarbonate, wherein the additional polycarbonate comprises 50 to 100 mole percent of repeat units derived from a bisphenol cyclohexane of the formula (VI):

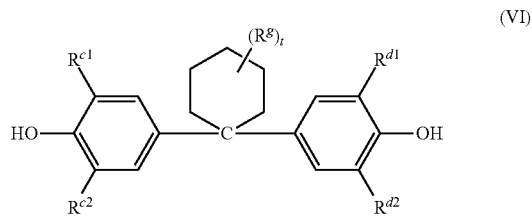

(VI)

wherein $R^{c1}$ and $R^{d1}$ are each independently $C_{1-12}$ alkyl, $R^{c2}$ and $R^{d2}$ are each independently hydrogen or $C_{1-12}$ alkyl, $R^g$ is $C_{1-12}$ alkyl or halogen, and t is 0 to 10; 0 to 50 mole percent of repeat units derived from a dihydroxy aromatic compound of formula (VIII):

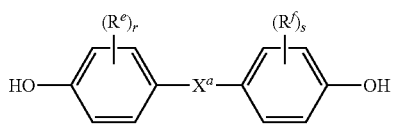

(VIII)

wherein $R^e$ and $R^f$ are each independently a halogen or $C_{1-10}$ alkyl group; r and s are each independently integers of 0 to 4; $X^a$ is a single bond or a bridging group connecting the two hydroxy-substituted aromatic groups; and the dihydroxy aromatic compound of formula (VIII) is not the same as the bisphenol cyclohexylidene of formula (VI).

In another embodiment, a method for the manufacture of a multilayer thermoplastic film comprises coextruding the aforementioned first and second layers.

In another embodiment, an article comprises the aforementioned multilayer thermoplastic film, and further optionally comprises a printed marking in combination with an injection molded polymeric base to which the film is bonded.

In still another embodiment, a method of molding an article comprises placing the multilayer thermoplastic film into a mold, and injecting a base polymer into a mold cavity space behind the multilayer to form a single molded part comprising the multilayer film and the injection molded base resin.

DETAILED DESCRIPTION OF THE INVENTION

The inventors hereof have unexpectedly found that multilayer decorative films having an excellent combination of properties, including impact properties and chemical resistance, can be achieved using two polycarbonate layers. The polycarbonate in the first layer comprises a specific combination of at least three different repeat units. An excellent combination of scratch, impact performance and chemical resistance is obtained when at least a portion of the repeat units are derived from a bisphenol cyclohexylidene, as described in further detail below.

Unexpectedly, it has also been found that an excellent combination of scratch, impact performance and chemical resistance is obtained when the first layer comprises a blend of at least two polycarbonates: the polycarbonate having the combination of at least three different repeat units; and an additional polycarbonate having repeat units derived from the bisphenol cyclohexane. A method of forming these polycarbonate blends comprises melt blending a first polycarbonate comprising a specific combination of at least three different repeat units; and an additional polycarbonate comprising repeat units derived from a bisphenol cyclohexylidene, optionally in the presence of a catalyst.

"Polycarbonates" as used herein generally means compositions having repeating structural carbonate units of formula (I):

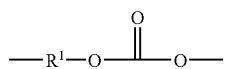

(I)

wherein $R^1$ is a residue derived from a dihydroxy compound of the formula HO—$R^1$—OH or chemical equivalent thereof. The multilayer thermoplastic film disclosed herein comprises a first polycarbonate that comprises repeat units derived from three different dihydroxy monomers (II), (III), and (IV), each as described below.

Monomer (II) is a first dihydroxy compound of the formula (II):

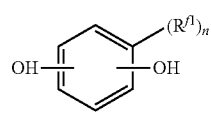

(II)

wherein n is 0 to 4, and $R^{f1}$ is a halogen, a $C_{1-10}$ hydrocarbon group, or a $C_{1-10}$ halogen-substituted hydrocarbon group. Specifically, n is 0 to 2, and $R^{f1}$ is a halogen, a $C_{1-3}$ hydrocarbon group, or a $C_{1-3}$ halogen-substituted hydrocarbon group. More specifically, n is 0 to 1, $R^{f1}$ is a halogen, a $C_{1-3}$ alkyl group, or a $C_{1-3}$ halogen-substituted alkyl group, and the hydroxy groups are in the para position relative to each other. Even more specifically, monomer (II) is hydroquinone, wherein n is 0 and the hydroxy groups are in the para position relative to each other.

Monomer (III) is a second dihydroxy compound that is not the same as monomer (II), and is of the formula (III):

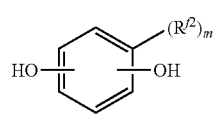

(III)

wherein m is 1 to 4, and $R^{f2}$ is a halogen, a $C_{1-10}$ hydrocarbon group, or a $C_{1-10}$ halogen-substituted hydrocarbon group. Specifically, m is 1 to 2, and $R^{f2}$ is a halogen, a $C_{1-3}$ hydrocarbon group, or a $C_{1-3}$ halogen-substituted hydrocarbon group. More specifically, m is 1, and $R^{f2}$ is a halogen, a $C_{1-3}$ alkyl group, or a $C_{1-3}$ halogen-substituted alkyl group, and the hydroxy groups are in the meta position relative to each other. Even more specifically, monomer (III) is methyl hydroquinone, wherein m is 1, $R^{f2}$ is methyl, and the hydroxy groups are in the para position relative to each other.

As shown in the Examples, a polycarbonate comprising units derived from a combination of hydroquinone (monomer (II)) and methyl hydroquinone (monomer (III)) provides good results.

Monomer (IV) is a dihydroxy compound of the formula (IV):

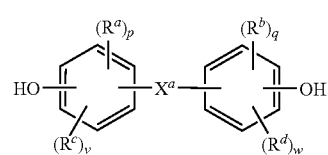

(IV)

wherein $R^a$ and $R^b$ are each independently a halogen or $C_{1-10}$ alkyl group that is meta to the hydroxy group on the same aromatic ring; $R^c$ and $R^d$ are each independently a $C_1$-$C_{10}$ alkyl group that is ortho to the hydroxy group on the same ring; p and q are each independently integers of 0 to 2; v and w are each independently integers of 0 to 2; and $X^a$ is a single bond or a bridging group, specifically a single bond, —O—, —S—, —S(O)—, —S(O)$_2$—, —C(O)—, or a C$_{1-18}$ organic group connecting the two hydroxy-substituted aromatic groups.

Specifically, X$^a$ in monomer (IV) can be a C$_{1-12}$ organic group. More specifically, the C$_{1-12}$ organic group can be disposed such that the hydroxy-substituted aromatic groups connected thereto are each connected to a common alkylidene carbon in X$^a$. Further, X$^a$ can be a substituted or unsubstituted C$_{3-18}$ cycloalkylidene, a C$_{1-24}$ alkylidene of formula —C(R$^j$)(R$^k$)— wherein R$^j$ and R$^k$ are each independently hydrogen, C$_{1-12}$ alkyl, C$_{3-12}$ cycloalkyl, C$_{7-12}$ arylalkyl, C$_{1-12}$ heteroalkyl, cyclic C$_{7-12}$ heteroarylalkyl, or a group of the formula —C(=R$^m$)— wherein R$^m$ is a divalent C$_{1-12}$ hydrocarbon group. In a specific embodiment, X$^a$ is a C$_{1-8}$ alkylidene or cycloalkylidene group.

In another specific embodiment, R$^a$ and R$^b$ are each independently a halogen or C$_{1-3}$ alkyl group that is meta to the hydroxy group on the same aromatic ring; R$^c$ and R$^d$ are each independently a C$_{1-3}$ alkyl group that is ortho to the hydroxy group on the same ring; p and q are each independently integers of 0 to 1; v and w are each independently integers of 0 to 2; and X$^a$ is a C$_{1-8}$ alkylidene or cycloalkylidene group.

The relative amounts of each of the units derived from monomers (II), (III), and (IV) in the first polycarbonate will depend on the desired properties of the multilayer film, as well as the properties of the second polycarbonate layer. It has been found that a combination of good scratch resistance and/or impact performance and chemical resistance is achieved when the sum of the mole percent of the repeat units derived from monomers (II) and (III) is greater than or equal to 30 mole percent, specifically 35 to 60 mole percent, more specifically 40 to 70 mole percent, each based on the total moles of the repeat units derived from monomers (II), (III), and (IV) in the first polycarbonate; and the mole percent of the repeat unit derived from monomer (IV) is 5 to 70 mole percent, specifically 10 to 60 mole percent, more specifically 20 to 50 mole percent, each based on the on the total moles the repeat units derived from monomers (II), (III), and (IV) in the first polycarbonate. Further, the total weight of the repeat units derived from monomers (II), (III), and (IV) is greater than or equal to 90 weight percent (wt. %) of the first polycarbonate. The ratio of the mole percent of repeat units derived from monomer (II):monomer (III) can be 1:99 to 99:1, specifically 10:90 to 90:10.

In another specific embodiment, monomer (IV) is of the formula (V):

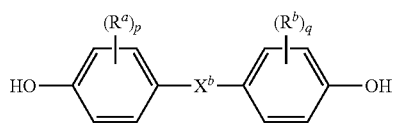

(V)

wherein R$^a$ and R$^b$ are each independently a halogen or C$_{1-10}$ alkyl group that is meta to the hydroxy group on the same aromatic ring; p and q are each independently integers of 0 to 2; and the bridging group X$^b$ is a C$_{1-8}$ alkylidene of formula —C(R$^j$)(R$^k$)— wherein R$^j$ and R$^k$ are each independently hydrogen or C$_{1-4}$ alkyl. Specifically, in formula (V), R$^a$ and R$^b$ are each methyl, p and q are each 1, and X$^b$ is isopropylidene. Alternatively, monomer (V) is bisphenol A, wherein q and p are each 0 and X$^b$ is isopropylidene.

Alternatively, monomer (IV) can be a bisphenol cyclohexylidene in which p and q are each 0, R$^c$ and R$^d$ are each a C$_{1-4}$ alkyl group, v and w are each 1 or 2, specifically 2, and X$^a$ is substituted or unsubstituted cyclohexylidene. In this embodiment, monomer (IV) is a bisphenol cyclohexylidene of the formula (VI):

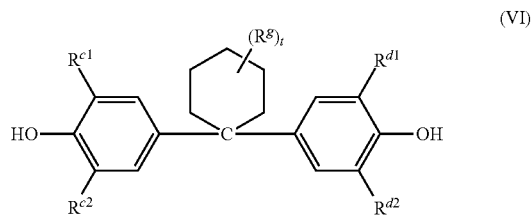

(VI)

wherein R$^{c1}$ and R$^{d1}$ are each independently C$_{1-12}$ alkyl, R$^{c2}$ and R$^{d2}$ are each independently hydrogen or C$_{1-12}$ alkyl, R$^g$ is C$_{1-12}$ alkyl or halogen, and t is 0 to 10.

More specifically, in structure (VI), R$^{c1}$ and R$^{d1}$ are each independently C$_{1-4}$ alkyl, R$^{c2}$ and R$^{d2}$ are each hydrogen, R$^g$ is C$_{1-4}$ alkyl, and t is 0 to 5. Still more specifically, monomer (VI) is a bisphenol cyclohexylidene wherein R$^{c1}$ and R$^{d1}$ are each methyl, R$^{c1}$ and R$^{d1}$ are each hydrogen, and t is 0, i.e., a monomer of formula (VII):

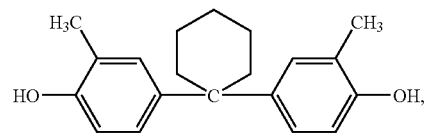

(VII)

which is also known as dimethyl bisphenol cyclohexane (DMBPC).

Thus, monomer (IV) can be 100 mole percent monomer (V), specifically bisphenol A, or 100 mole percent monomer (VI), specifically monomer (VII). In still another embodiment, monomer (IV) is a combination of two different types of compounds: a bisphenol cyclohexylidene of formula (VI), specifically formula (VII), and a monomer of formula (IV) that is not the same as the bisphenol cyclohexylidene of formula (VI), for example a monomer of formula (IV) wherein R$^a$ and R$^b$ are each independently a halogen or C$_{1-10}$ alkyl group that is meta to the hydroxy group on the same aromatic ring; R$^c$ and R$^d$ are each independently a C$_1$-C$_{10}$ alkyl group that is ortho to the hydroxy group on the same ring; p and q are each independently integers of 0 to 2; v and w are each independently integers of 0 to 2; and X$^a$ is a single bond, —O—, —S—, —S(O)—, —S(O)$_2$—, —C(O)—, or a C$_{1-8}$ alkylidene of formula —C(R$^j$)(R$^k$)— wherein R$^j$ and R$^k$ are each independently hydrogen or C$_{1-4}$ alkyl.

In this embodiment, monomer (IV) is 1 to 99 mole percent of a bisphenol cyclohexylidene of formula (VI), specifically formula (VII), and 1 to 99 mole percent of a monomer of formula (IV) that is not the same as the bisphenol cyclohexylidene of formula (VI). More specifically, monomer (IV) is 20 to 80 mole percent of a bisphenol cyclohexylidene of formula (VI), specifically formula (VII), and 20 to 80 mole percent of a monomer of formula (IV) that is not the same as the bisphenol cyclohexylidene of formula (VI). Even more specifically, monomer (IV) comprises 40 to 60 mole percent of a bisphenol cyclohexylidene of formula (VI), specifically formula (VII), and 40 to 60 mole percent of a monomer of formula (IV) that is not the same as the bisphenol cyclohexylidene of formula (VI).

In still another embodiment, monomer (IV) is a combination of a bisphenol cyclohexylidene of formula (VI), specifically formula (VII), and a monomer of formula (V), specifically bisphenol A. In this embodiment, monomer (IV) is 1 to 99 mole percent of a bisphenol cyclohexylidene of formula (VI), specifically formula (VII), and 1 to 99 mole percent of a monomer of formula (V), specifically bisphenol A. More specifically, monomer (IV) is 20 to 80 mole percent of a bisphenol cyclohexylidene of formula (VI), specifically formula (VII), and 20 to 80 mole percent of a monomer of formula (V), specifically bisphenol A. Even more specifically, monomer (IV) is 40 to 60 mole percent of a bisphenol cyclohexylidene of formula (VI), specifically formula (VII), and 40 to 60 mole percent of a monomer of formula (V), specifically bisphenol A.

Polycarbonates comprising repeat units derived from the foregoing monomers (II), (III), and (IV) can be manufactured by processes such as interfacial polymerization and melt polymerization. Although the reaction conditions for interfacial polymerization may vary, an exemplary process generally involves dissolving or dispersing the dihydroxy monomers in aqueous caustic sodium hydroxide or potassium hydroxide, adding the resulting mixture to a suitable water-immiscible solvent (e.g., methylene chloride, 1,2-dichloroethane, chlorobenzene, toluene, or the like), and contacting the reactants with a carbonate precursor (e.g., carbonyl chloride, or a haloformate such as a bishaloformate of the monomer) in the presence of a catalyst such as triethylamine or a phase transfer catalyst, under controlled pH conditions, e.g., about 8 to about 10. Among the phase transfer catalysts that can be used are catalysts of the formula $(R^3)_4Q^+X^-$, wherein each $R^3$ is the same or different, and is a $C_{1-10}$ alkyl group; Q is a nitrogen or phosphorus atom; and X is an inorganic or $C_{1-20}$ organic anion, in particular a halogen atom, a $C_{1-8}$ alkoxy group, or a $C_{6-18}$ aryloxy group. Useful phase transfer catalysts include, for example, $[CH_3(CH_2)_3]_4N^+X^-$, $[CH_3(CH_2)_3]_4P^+X^-$, $[CH_3(CH_2)_5]_4N^+X^-$, $[CH_3(CH_2)_6]_4N^+X^-$, $[CH_3(CH_2)_4]_4NX^-$, $CH_3[CH_3(CH_2)_3]_3N^+X^-$, and $CH_3[CH_3(CH_2)_2]_3N^+X^-$, wherein X is Cl$^-$, Br$^-$, a $C_{1-8}$ alkoxy group or a $C_{6-18}$ aryloxy group.

Alternatively, melt processes can be used to make the polycarbonates. Generally, in the melt polymerization process, polycarbonates are prepared by co-reacting, in a molten state, the dihydroxy monomers and a diaryl carbonate ester in the presence of a catalyst in a Banbury® mixer, twin screw extruder, or the like to form a uniform dispersion. Volatile monohydric phenol is removed from the molten reactants by distillation and the polymer is isolated as a molten residue. Catalysts include phase transfer catalysts of formula $(R^3)_4Q^+X^-$ above, wherein each of $R^3$, Q, and X are as defined above.

Branched polycarbonate blocks can also be used and can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates.

The polycarbonates containing repeat units derived from monomers (II), (III), and (IV) can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight (Mw) of 10,000 to 200,000 Daltons, specifically 20,000 to 100,000 Daltons, as measured by GPC, using a crosslinked styrene-divinylbenzene column and calibrated to polycarbonate references. GPC samples are prepared at a concentration of 1 mg per ml and are eluted at a flow rate of 1.5 ml per minute. In one embodiment, the polycarbonate is amorphous.

The first layer can comprise a single polycarbonate as described above ("first polycarbonate"). For example, in one embodiment, the first layer comprises a first polycarbonate comprising units derived from monomer (II), monomer (III), and a bisphenol cyclohexylidene of formula (VI), specifically of formula (VII). The Examples show that a good combination of properties is obtained when the first polycarbonate comprises units derived from hydroquinone, methyl hydroquinone, and dimethyl bisphenol cyclohexane. No other polymer is present in the first layer.

Alternatively, the first layer can comprise a blend comprising a first polycarbonate as described above and an additional polycarbonate different from the first polycarbonate. The additional polycarbonate comprises greater than or equal to 50 mole percent of repeat units derived from the bisphenol cyclohexylidene of formula (VI), specifically formula (VII), based on the total weight of the additional polycarbonate. Other repeat units that can optionally be present in the additional polycarbonate are different from the bisphenol cyclohexylidene of formula (VI), and are derived from a dihydroxy aromatic compound of formula (VIII):

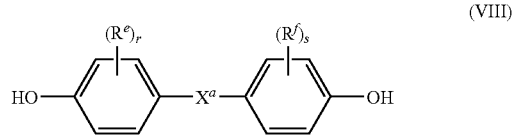

(VIII)

wherein $R^e$ and $R^f$ are each independently a halogen or $C_{1-10}$ alkyl group; r and s are each independently integers of 0 to 4; and $X^a$ is a single bond or a bridging group connecting the two hydroxy-substituted aromatic groups, where the single bond or the bridging group and the hydroxy substituent of each $C_6$ arylene group are disposed ortho, meta, or para (specifically para) to each other on the $C_6$ arylene group. In an embodiment, $X^a$ is a single bond, —O—, —S—, —S(O)—, —S(O)$_2$—, —C(O)—, or a $C_{1-18}$ organic group. The $C_{1-18}$ organic group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic group. Specifically, $X^a$ can be a $C_{1-8}$ alkylidene bridging group of the formula —C(R$^j$)(R$^k$)— wherein R$^j$ and R$^k$ are each independently hydrogen or $C_{1-4}$ alkyl. In one embodiment, r and s is each 1, and $R^a$ and $R^b$ are each a $C_{1-3}$ alkyl group, specifically methyl, disposed meta to the hydroxy group on each arylene group. In another embodiment, r and s is each 0. Specific examples of dihydroxy aromatic compounds of formula (VIII) include 1,1-bis(4-hydroxyphenyl) methane, 1,1-bis(4-hydroxyphenyl)ethane, 2,2-bis(4-hydroxyphenyl)propane ("bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, and 2-phenyl-3,3-bis(4-hydroxyphenyl)phthalimidine (PPPBP).

In a specific embodiment, an impact modifier and/or an ungrafted rigid polymer is absent from the composition used to manufacture the first layer. It has been found that the first layer has improved scratch resistance, in combination with improved impact properties and/or chemical resistance, when the first polycarbonate, the additional polycarbonate, or both comprise units derived from a bisphenol cyclohexylidene of formula (VI), specifically of formula (VII).

Specifically, the first layer can comprise a first polycarbonate comprising units derived from monomer (II), monomer (III), and a bisphenol cyclohexylidene of formula (VI), specifically of formula (VII). The Examples show that a good combination of properties is obtained when the first polycarbonate comprises units derived from hydroquinone, methyl hydroquinone, and dimethyl bisphenol cyclohexane. Optionally, no other polymer is present in the first layer.

In another embodiment, the first layer comprises a first polycarbonate comprising units derived from monomer (II), monomer (III), and monomer (IV), specifically a monomer of formula (V); and an additional polycarbonate comprising units derived from a bisphenol cyclohexylidene of formula (VI), specifically formula (VII). The additional polycarbonate comprises greater than or equal to 50 mole percent of repeat units derived from the bisphenol cyclohexylidene of formula (VI), specifically formula (VII), based on the total weight of the additional polycarbonate. When present, the other repeat units are derived from a dihydroxy aromatic compound of formula (VIII), specifically formula (V), even more specifically bisphenol A. Alternatively, the additional polycarbonate is a homopolymer of dimethyl bisphenol cyclohexane. Still more specifically, the first polycarbonate comprises repeat units derived from monomer (II), monomer (III), and monomer (V); and the additional polycarbonate is a homopolymer of repeat units derived from a bisphenol cyclohexylidene of formula (VI), specifically formula (VII). The Examples show that a good combination of properties is obtained when the first polycarbonate comprises units derived from hydroquinone, methyl hydroquinone, and bisphenol A; and the additional polycarbonate is a homopolymer of dimethyl bisphenol cyclohexane. Optionally, the only polymers in the first layer are the first polycarbonate and the additional polycarbonate.

In another embodiment, the polycarbonate compositions for use in the first layer comprises a blend of a first polycarbonate comprising repeat units derived from monomer (II), monomer (III), and monomer (IV); and an additional polycarbonate also comprising units derived from monomer (II), monomer (III), and monomer (IV). Specifically, the monomer of formula (IV) in the first polycarbonate is a monomer of formula (V), and the monomer of formula (IV) in the additional polycarbonate is a bisphenol cyclohexylidene of formula (VI) and more specifically the monomer of formula (VII). The additional polycarbonate comprises greater than or equal to 50 mole percent of repeat units derived from the bisphenol cyclohexylidene of formula (VI), and more specifically formula (VII), based on the total weight of the additional polycarbonate.

When blends for use in the first layer comprise a combination of the first polycarbonate and an additional polycarbonate, the blend comprises 1 to 95 wt. % of the first polycarbonate, and 5 to 99 wt. % of the additional polycarbonate, each based on the total weight of the polycarbonates in the polycarbonate blend. In some embodiments, a superior combination of mechanical, chemical, and scratch resistance is found in formulations comprising 5 to 70 wt. % of the first polycarbonate (specifically wherein the first polycarbonate comprises monomer units derived from hydroquinone, methyl hydroquinone, and bisphenol A), and 30 to 95 wt. % of an additional polycarbonate comprising at least 50 mole percent of units derived from a bisphenol cyclohexylidene of formula (VI), specifically dimethyl bisphenol cyclohexane. In other embodiments, superior resistance to staining or cracking after exposure to gasoline is found in formulations comprising 5 to 60 wt. % of the first polycarbonate (specifically wherein the first polycarbonate comprises monomer units derived from hydroquinone, methyl hydroquinone, and bisphenol A), and from 40 to 90 wt. % of an additional polycarbonate comprising at least 50 mole percent of units derived from a bisphenol cyclohexylidene of formula (VI), specifically dimethyl bisphenol cyclohexane. Each of the foregoing wt. % amounts is based on the total weight of the polycarbonates in the first layer.

The multilayer thermoplastic film comprising a first layer as described above (i.e., a first polycarbonate as described above or a blend of a first polycarbonate and an additional polycarbonate) and a second layer as described below can have an advantageous combination of properties, including one or more of hardness, scratch resistance, impact performance, and chemical resistance, in combination with one or more of high light transmissivity, low haze, good Izod impact values.

A surface of the first layer of a coextruded multilayer thermoplastic film comprising the first polycarbonate or the polycarbonate blend can exhibit a pencil hardness of greater than or equal to HB as measured according to ASTM D3363-05 using a 500 gram load. A surface of the first layer of the coextruded multilayer thermoplastic film can exhibit a scratch depth of less than or equal to 1.0 micrometers (μm), specifically less than or equal to 0.80 micrometers, and even less than or equal to 0.50 micrometers, as determined using an applied force of 6 N.

Use of a first layer as described above in combination with a transparent second layer can provide a multilayer film that exhibits a light transmission of greater than or equal to 60%, specifically greater than or equal to 70%, more specifically greater than or equal to 80%, still more specifically greater than or equal to 90%, as measured in accordance with ASTM D1003-00 using a sample having a thickness of 0.32 mm.

A coextruded multilayer film comprising the above-described first layer can have a tear initiation strength of greater than or equal to 200 Newtons per millimeter (N/mm), specifically greater than or equal to 230 N/mm, and more specifically greater than or equal to 280 N/mm as measured by ASTM D1004-03; a tear propagation strength of greater than or equal to 8.0 N/mm, specifically greater than or equal to 10 N/mm, more specifically greater than or equal to 11 N/mm, and even more specifically greater than or equal to 12 N/mm as measured in accordance with D1938-02; and/or a tensile modulus of greater than or equal to 2,000 megaPascals (MPa), specifically greater than or equal to 2,100 MPa, and more specifically, greater than or equal to 2,200 MPa as measured in accordance with ISO 527.

The polycarbonate blends can have a particularly advantageous combination of properties, including one or more of hardness, scratch resistance, and chemical resistance, in combination with one or more of high light transmissivity, low haze, good impact properties. A sample comprising the polycarbonate blend can exhibit an Izod notched impact (on a 4 mm molded sample) of at least 2.5, specifically at least 3 kiloJoules per square meter (kJ/m$^2$) as measured in accordance with ISO 180-1A.

The multi-axial impact of the polycarbonate blend can be characterized by a maximum force of 7000 to 12000 Newtons (N), an energy at maximum of 20 to 100 Joules (J), an energy at break of 20 to 110 J and a deflection at break of 6 to 20 mm, as measured on a 3.2 mm molded sample in accordance with ISO 6603-2.

Molded samples comprising the polycarbonate blend can have a scratch resistance determined using an Erichsen Scratch Tester Type 413 according to ISO 1518, by applying a force of 6 N to a conical stylus with radius of 0.01 millimeter (mm) of less than 18 micrometers, but more specifically less than 14 micrometers, even more preferably less than 13 micrometers, less than 12 micrometers, or less than 10 micrometers.

It has further been found by the inventors hereof that when a blend of different polycarbonates is used in the first layer, a catalyst can be present during the melt blending of the polycarbonate combination. Thus, also disclosed is a method of making a polycarbonate composition comprising melt blending a mixture comprising a first polycarbonate comprising repeat units derived from monomers (II), (III), and (V); an additional polycarbonate comprising greater than or equal to 50 mole percent of repeat units derived from a bisphenol cyclohexylidene of formula (VI), specifically formula (VII); and a catalyst.

Suitable catalysts are numerous and include a wide variety of bases and Lewis acids. When used to make a multilayer thermoplastic film, the catalyst is selected so as to not substantially adversely affect the manufacture or properties of the polycarbonate composition and resulting film.

Specific catalysts within the scope of this disclosure, i.e., those which produce first layers having an improved combination of properties, include phase transfer and transesterification catalysts such as $C_4$-$C_{80}$ tetraorganoammonium compounds, $C_4$-$C_{80}$ tetraorganophosphonium compounds, or a combination comprising at least one of the foregoing catalysts, in particular ammonium and phosphonium compounds of the formula $(R^4)_4Q^+X$ as described above, wherein each $R^4$ is independently a $C_{1-20}$ hydrocarbon; Q is a nitrogen or phosphorus atom; and X is an inorganic or $C_{1-20}$ organic anion, in particular a halogen atom, a $C_{1-8}$ alkoxy group, or a $C_{6-18}$ aryloxy group.

Exemplary tetraorganoammonium compounds include compounds of structure (IX):

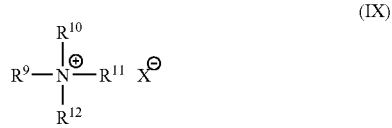

wherein $R^9$ to $R^{12}$ are each independently a $C_{1-20}$ alkyl radical, $C_{4-20}$ cycloalkyl radical, or a $C_{4-20}$ aryl radical, specifically wherein $R^9$ to $R^{12}$ are the same $C_{1-8}$ alkyl radical; and $X^-$ is a $C_{1-20}$ organic or inorganic anion, for example hydroxide, halide, $C_{1-20}$ carboxylate, sulfonate, sulfate, carbonate, or bicarbonate. In one embodiment, $R^9$ to $R^{12}$ are the same $C_{1-8}$ alkyl radical, and $X^-$ is a bromide, chloride, carbonate, $C_{1-6}$ organic ion (e.g., carboxylate, alkoxide, phenoxide or bisphenoxide), or hydroxide.

Exemplary tetraorganophosphonium compounds include compounds of structure (X):

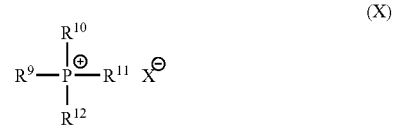

wherein $R^9$ to $R^{12}$ and $X^-$ are as previously described. Specifically, $R^9$ to $R^{12}$ are the same $C_{1-8}$ alkyl radical, and $X^-$ is a bromide, chloride, carbonate, $C_{1-6}$ organic ion (e.g., carboxylate, alkoxide, phenoxide, or bisphenoxide), or hydroxide.

Where $X^-$ is a polyvalent anion such as carbonate or sulfate it is understood that the positive and negative charges in structures (VIII) and (IX) are properly balanced. For example, when $R^9$ to $R^{12}$ are monovalent alkyl groups and $X^-$ is carbonate, it is understood that $X^-$ represents ½$(CO_3^{-2})$.

The quaternary ammonium compound, quaternary phosphonium compound, or combination thereof can optionally be used in combination with an alkali metal and/or alkaline earth metal salt and/or hydroxide. For example, the catalyst can be a mixture of sodium hydroxide, and tetrabutyl phosphonium acetate. In another embodiment, the catalyst is a mixture of sodium hydroxide and tetramethyl ammonium hydroxide.

Specific catalysts include a tetraalkylphosphonium hydroxide, tetraalkylphosphonium carbonate, tetraalkylammonium hydroxide, tetraalkyl ammonium carbonate, tetraalkylammonium phosphate, tetraalkylammonium acetate, and combinations comprising at least one of the foregoing catalysts, wherein each alkyl group independently has 1 to 6 carbon atoms. More specifically, the catalyst can be tetramethylammonium hydroxide, tetrabutylammonium hydroxide, tetraethylammonium hydroxide, tetrabutylphosphonium acetate, tetrabutylphosphonium hydroxide, or a combination comprising at least one of the foregoing catalysts. In one embodiment the catalyst is a tetra $C_1$-$C_{10}$ alkyl phosphonium hydroxide that is decomposable under reaction conditions to very low levels of the active catalytic species. Most specifically, the catalyst is tetrabutylphosphonium hydroxide (TBPH).

The catalyst can be added in a variety of forms. The catalyst can be added as a solid, for example as a powder, or it can be dissolved in a solvent, for example, in water or alcohol. An effective amount of catalyst will depend on the types and relative amounts of each polycarbonate and the desired properties of the first layer. The catalyst is present in sufficient amount to catalyze the reaction to a sufficient degree to product a transparent reaction product, but is not present in an excessive degree, where an excess of catalyst can produce an opaque reaction product. The optimal catalyst level will vary depending on the particular catalyst and can be determined by testing. In general, the catalyst is present in an amount from 0.0005 to 0.05 wt. %, based on the total weight of the polycarbonates. Specifically, the catalyst can be present in an amount of 0.001 to 0.01 wt. %, more specifically in an amount of 0.005 to 0.08 wt. %, more specifically 0.002 to 0.07 wt. %, based on the total weight of the polycarbonates, particularly when using a tetra $C_1$-$C_6$ alkyl phosphonium hydroxide such as tetrabutylphosphonium hydroxide.

The relative amount of the first polymer and the additional polymer in the catalyzed blend can vary widely, and will depend on the desired properties of the composition. For example, the catalyzed blend can comprise 1 to 95 wt. % of the first polycarbonate, and 5 to 99 wt. % of the additional polycarbonate, each based on the total weight of the polycarbonates in the polycarbonate blend. In some embodiments, a superior combination of chemical, impact, and scratch resistance is found in formulations comprising 5 to 70 wt. % of the first polycarbonate (specifically wherein the first polycarbonate comprises monomer units derived from hydroquinone, methyl hydroquinone, and bisphenol A), and 30 to 95 wt. % of an additional polycarbonate comprising at least 50 mole percent of units derived from a bisphenol cyclohexylidene of formula (VI), specifically dimethyl bisphenol cyclohexane. In other embodiments, superior resistance to staining or cracking after exposure to gasoline is found in formulations comprising 5 to 60 wt. % of the first polycarbonate (specifically wherein the first polycarbonate comprises monomer units derived from hydroquinone, methyl hydroquinone, and bisphenol A), and from 40 to 90 wt. % of an additional polycarbonate comprising at least 50 mole percent of units derived from a bisphenol cyclohexylidene of formula (VI), specifically dimethyl bisphenol cyclohexane. Each of the foregoing wt. % amounts is based on the total weight of the polycarbonates in the first layer.

The catalyzed reaction is generally carried out in the melt, for a time effective to provide a uniform dispersion having the desired properties. The temperatures and times can therefore vary depending on the identity of the polycarbonates and the properties desired. Exemplary temperatures are 250 to 340° C., more specifically 280 to 310° C. An exemplary time is 10 to 60 seconds. The catalyzed reaction can be conveniently accomplished in an extruder, reaction, vessel, or the like. In one embodiment, in one manner of proceeding, the powdered polycarbonates and/or other optional components are first blended, for example using hand mixing or a Henschel™ high speed mixer. The blend is then fed into the throat or feedthroat of a twin-screw extruder via a hopper. Alternatively, one or more of the components may be incorporated into the composition by feeding directly into the extruder at the throat and/or downstream through a sidestuffer or feedport. Such additives may also be compounded into a masterbatch with a desired polymeric resin and fed into the extruder. The extruder is generally operated at a temperature higher than that necessary to cause the composition to flow. The catalyst can be fed as an aqueous solution concomitantly down the throat of the extruder, or it can be fed using a metering pump or by a calibrated gravity fed drip. The catalyst may also be blended with the polycarbonates in a mixer prior to extrusion. The catalyst can be diluted in water from a concentration of 50 to 1 wt. % catalyst in water. The extrudate can be quenched in a water bath and pelletized. Such pellets can be used for subsequent molding, shaping, or forming. The foregoing melt blending process can also be used to prepare the polycarbonate blends without the catalyst.

Using the catalyst in preparing the polycarbonate composition, certain advantageous properties can be achieved, including one or more of hardness, scratch resistance, and chemical resistance, in combination with one or more of high light transmissivity, low haze, and good impact properties. For example, a sample molded from the catalyzed polycarbonate blend and having a thickness of 3.2 mm has a light transmission of greater than 60%, specifically greater than 70%, more specifically greater than 80% as measured by ASTM D1003-00 and a haze of less than 73% as measured by ASTM D1003-00. Use of a first layer comprising the catalyzed blend in combination with a clear second layer (transmission greater than 90%) can provide a multilayer film that exhibits a light transmission of greater than or equal to 60%, specifically greater than or equal to 70%, more specifically greater than or equal to 80%, still more specifically greater than 90%, as measured in accordance with ASTM D1003-00, measured using a multilayer film having a thickness of 0.32 mm.

A surface of a coextruded multilayer film comprising the catalyzed polycarbonate blend can exhibit a pencil hardness of greater than or equal to 2B as measured according to ASTM D3363-05 using a 500-g load. A surface of the first layer of the coextruded multilayer thermoplastic film can exhibit a scratch depth of less than or equal to 1.0 micrometers (μm), specifically less than or equal to 0.80 micrometers, and even less than or equal to 0.50 micrometers, as determined using an applied force of 6 N.

A coextruded multilayer film comprising the catalyzed polycarbonate blend can have a tear initiation strength of greater than or equal to 200 Newtons per millimeter (N/mm), specifically greater than or equal to 230 N/mm, and more specifically greater than or equal to 280 N/mm as measured by ASTM D1004-03; a tear propagation strength of greater than or equal to 8 N/mm, specifically greater than or equal to 10 N/mm, more specifically greater than or equal to 11 N/mm, and even greater than or equal to 12 N/mm as measured in accordance with D1938-02; and/or a tensile modulus of greater than or equal to 2,000 megaPascals (MPa), specifically greater than or equal to 2,100 MPa, and more specifically, greater than or equal to 2,200 MPa as measured in accordance with ISO 527.

In any of the foregoing embodiments, a variety of different polycarbonates can be used as the second layer of the multilayer film, wherein the second layer is disposed adjacent the first layer. In addition, a variety of different polycarbonates can be used as the base polymer in the manufacture of articles using the multilayer films for in-mold decoration. The particular polycarbonate in the second layer and/or base polymer is selected based on the desired properties of the multilayer film and article formed therefrom. For example, the second layer and/or base polymer can comprise a polycarbonate of formula (I) in which great than 60 wt. % of the $R^1$ units are derived from a dihydroxy compound of the formula HO—$R^1$—OH, in particular of the formula HO-$A^1$-$Y^1$-$A^2$-OH wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. In another exemplary embodiment, each $R^1$ is derived from a dihydroxy aromatic compound of formula (XI):

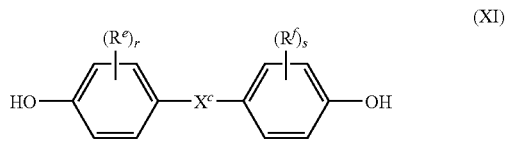

wherein $R^e$ and $R^f$ are each independently a halogen or $C_{1-10}$ alkyl group; r and s are each independently integers of 0 to 4; and $X^c$ is a single bond or a $C_{1-18}$ bridging group connecting the two hydroxy-substituted aromatic groups, where the single bond or the bridging group and the hydroxy substituent of each $C_6$ arylene group are disposed ortho, meta, or para (specifically para) to each other on the $C_6$ arylene group. In an embodiment, $X^c$ is a single bond, —O—, —S—, —S(O)—, —S(O)$_2$—, —C(O)—, or a $C_{1-18}$ organic group. The $C_{1-18}$ organic group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic group. Specifically, $X^c$ can be a $C_{1-8}$ alkylidene bridging group of the formula —C(R$^j$)(R$^k$)— wherein R$^j$ and R$^k$ are each independently hydrogen or $C_{1-4}$ alkyl. $X^c$ represents In one embodiment, p and q is each 1, and R$^e$ and R$^f$ are each a $C_{1-3}$ alkyl group, specifically methyl, disposed meta to the hydroxy group on each arylene group. Specific examples of dihydroxy aromatic compounds of formula (XI) include 1,1-bis(4-hydroxyphenyl)methane, 1,1-bis(4-hydroxyphenyl) ethane, bisphenol A, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, and 2-phenyl-3,3-bis(4-hydroxyphenyl) phthalimidine (PPPBP). Copolycarbonates manufactured from combinations comprising at least one of the dihydroxy aromatic compounds of formula (XI) can also be used.

In one specific embodiment, the polycarbonate in the second layer and/or base polymer comprises greater than or equal to 80 wt. % of repeat units of bisphenol A. Alternatively, the polycarbonate in the second layer is a homopolymer of bisphenol A. In another embodiment, no units derived from a bisphenol cyclohexylidene are present in the second layer. In another embodiment, no units derived from DMBPC are present in the second layer.

The polycarbonates used in the second layer and/or base polymer can have an intrinsic viscosity, as determined in chloroform at 25° C., of 0.3 to 1.5 deciliters per gram (dl/gm), specifically 0.45 to 1.0 dl/gm. The polycarbonates can have Mw=10,000 to 200,000 Daltons, specifically 20,000 to 100,000 Daltons, as measured by GPC, using a crosslinked styrene-divinylbenzene column and calibrated to polycarbonate references. GPC samples are prepared at a concentration of 1 mg per ml and are eluted at a flow rate of 1.5 ml per minute.

The first and/or second layers of the multilayer thermoplastic film and/or base polymer can further include impact modifier(s) that do not adversely affect the desired composition properties, including light transmission. Impact modifiers can include, for example, high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used. Impact modifiers, when used, can be present in amounts of 1 to 30 wt. %, based on the total weight of the polymers in the relevant composition.

The polycarbonate compositions can include various optional additives (e.g., filler(s) and/or reinforcing agent(s)) ordinarily incorporated in polymer compositions of this type, with the proviso that the additives are selected so as to not significantly adversely affect the desired properties of the extrudable composition, for example, light transmission of greater than 60%. Combinations of additives can be used. Such additives can be mixed at a suitable time during the mixing of the components for forming the composition. Possible optional additives include antioxidants, flow aids, UV absorbers, stabilizers such as light stabilizers and others, flame retardants, lubricants, plasticizers, colorants, including pigments and dyes, anti-static agents, metal deactivators, and combinations comprising one or more of the foregoing additives. Effective amounts of each of the foregoing additives are known (e.g., from 0.001 to 10 wt. % of the total weight of the composition), and are selected so as to not significantly adversely affect the desired properties of the compositions.

The polycarbonate compositions can be used to form a variety of articles, including sheets. Such sheets are useful by themselves, or in combination with other layers, and can be used in articles for the transportation and construction industry. The polycarbonate compositions can also be used to form a multiwall sheet comprising a first sheet having a first side and a second side, wherein the first side of the first sheet is disposed upon a first side of a plurality of ribs; and a second sheet having a first side and a second side, wherein the first side of the second sheet is disposed upon a second side of the plurality of ribs, and where the first side of the plurality of ribs is opposed to the second side of the plurality of ribs. The first and/or the second sheets comprise the polycarbonate compositions.

The sheets can be formed by processes such as sheet extrusion, injection molding, gas-assist injection molding, extrusion molding, compression molding, blow molding, and combinations comprising at least one of the foregoing processes. Specific sheet extrusion processes include melt casting, blown sheet extrusion, and calendaring. Co-extrusion and lamination processes can be used to form multilayer sheets or sheets. The sheets can alternatively be prepared by casting a solution or suspension of the polycarbonate composition in a suitable solvent onto a substrate, belt, or roll, followed by removal of the solvent. Single or multiple layers of coatings can also be applied to the single or multilayer sheets to impart additional properties such as scratch resistance, ultra violet light resistance, aesthetic appeal, and the like. Coatings can be applied through standard application techniques such as rolling, spraying, dipping, brushing, flow coating, or combinations comprising at least one of the foregoing application techniques.

Further in any of the foregoing embodiments, the multilayer thermoplastic film can be formed using a continuous calendaring co-extrusion process. In such a process, first and second single screw extruders can supply polymer melts for the individual layers (i.e., the decorative layer and any additional polymeric layers disposed on either side of the substrate layer) into a feed block of an extruder apparatus. A die forms a molten polymeric web that is fed to a three-roll calendaring stack. Commonly, such a calendaring stack can comprise two to four counter-rotating cylindrical rolls with each roll, individually, made from metal (e.g., steel) or rubber coated metal. Each roll can be heated or cooled, as is appropriate.

The molten web formed by the die can be successively squeezed between the calendaring rolls. The inter-roll clearance ("nip") through which the web is drawn determines the thickness of the layers.

The layers can be coextruded to form various ratios of the first layer to total thickness of the multilayer thermoplastic film. The first layer can have a thickness of 1% to 99%, specifically, 5% to 60%, more specifically 10% to 40% of the total multilayer thermoplastic film. Generally, the overall thickness of the multilayer film can be up to and even exceeding several millimeters. More specifically, the multilayer film can have a thickness (e.g., gage) of 1 mil (25.4 μm) to 500 mils (12,700 μm), more specifically, 4 mils (100 μm) to 40 mils (1016 μm), and yet more specifically, 5 mils (125 μm) to 30 mils (762 μm).

In use, a surface of one or both layers of the multilayer thermoplastic film can be subjected to printing with ink. In one embodiment, an exposed surface of the second layer (a surface opposite the surface adjacent to first layer) layer can be subsequently decorated, in particular printed with markings such as alphanumerics, graphics, symbols, indicia, logos, aesthetic designs, multicolored regions, and a combination comprising at least one of the foregoing. In some cases, the multilayer thermoplastic film can be used solely as a protective film, without printing.

The multilayer films (with or without printing) can further be shaped into a three-dimensional film for specific applications. For three-dimensional IMD pieces or parts, there are various techniques for forming three-dimensional shapes. For example, for parts having a draw depth greater than or equal to 1 inch (2.54 centimeters (cm)), thermoforming or variations of thermoforming can be employed. Variations include but are not limited to vacuum thermoforming, zero gravity thermoforming, plug assist thermoforming, snap back thermoforming, pressure assist thermoforming, and high pressure thermoforming. For parts containing detailed alphanumeric graphics or draw depths less than or equal to 1 inch (2.54 cm), cold forming techniques are exemplary. These include but are not limited to embossing, matched metal forming, bladder or hydro forming, pressure forming, or contact heat pressure forming.

A molded article is also disclosed herein, comprising the above-described multilayer thermoplastic film after the film is printed (decorated) on a surface(s) thereof with a print (decoration) and bonded to an injection molded polymeric base structure. The coated multilayer polycarbonate film can be cold formed or thermoformed into a three-dimensional shape matching the three-dimensional shape of the injection molded polymeric base structure. While polycarbonates have been disclosed for use as the base polymer in the polymeric base structure, it is to be understood that other polymers, for example polyesters, can alternatively be used.

Also disclosed herein is a method of molding an article, comprising placing the above-described decorative film into a mold, and injecting a base polymer composition into the mold cavity space behind the decorative film, wherein the decorative film and the injection molded base polymer composition form a single molded part or article. According to one exemplary embodiment, molded articles are prepared by: printing a decoration on a surface of a multilayer thermoplastic film (specifically on the exposed surface of the second layer), for example by screen printing to form a decorative film; forming and optionally trimming the decorative film into a three-dimensional shape; fitting the decorative film into a mold having a surface which matches the three-dimensional shape of the decorative film; and injecting a base polymer composition, which can be substantially transparent, into the mold cavity behind the decorative film to produce a one-piece, permanently bonded three-dimensional article or product.

For IMD processes, high temperature, formable inks can be used for graphics application. Second surface decoration can employ more robust ink systems to provide adequate ink adhesion during the molding process. Moreover, in applications such as light assemblies where light transmission is important, dye inks can be used rather than pigmented inks so as not to affect light transmission and haze readings. Once the ink is printed, it can be either dried or cured depending on the ink technology used. If the ink is solvent or water based, then a gas fired or electric dryer can be used to dry the ink.

Among other desirable performance properties of a transparent decorative film and articles in which the multilayer film is contained is that it can have a birefringence of less than or equal to 20 nm. A low birefringence overlay film can be used for three-dimensional thermoformed (vacuum or pressure forming) articles prepared by IMD process for applications that require tight graphics registration. Various advantageous properties of the present multilayer thermoplastic film are described below in greater detail in the examples.

The multilayer thermoplastic polycarbonate films and decorative films disclosed herein have numerous applications, for example, cell phone covers (top, bottom, flip); cell phone lenses; cell phone key pads; lap and computer covers; key boards; membrane switches; adhesive labels; buttons and dials of interior automotive interfaces; heat ventilation and air conditioning panels; automotive clusters; control panels for appliances (washer, dryer, microwave, air conditioner, refrigerator, stove, dishwasher, etc.); housings, lenses, keypads, or covers for hand held devices (blood analyzers, calculators, MP3 or MP4 players, gaming devices, radios, satellite radios, GPS units, etc.); touch panel displays; screens, keypads, membrane switches, or other user interfaces for ATMs, voting machines, industrial equipment, and the like; housings, lenses, keypads, membrane switches, or covers for other consumer and industrial electronic devices (TVs, monitors, cameras, video camcorders, microphones, radios, receivers, DVD players, VCRs, routers, cable boxes, gaming devices, slot machines, pachinko machines, cash registers, hand held or stationary scanners, fax machines, copiers, printers, etc); covers and buttons of memory storage devices and flash drives; covers and buttons for the mouse, blue tooth transmitters, hands free devices, headsets, earphones, speakers, etc; labels, housings, lenses, touch interfaces for musical instruments such as electronic key boards or periphery equipment such as amplifiers, mixers, and sound boards; and displays, covers, or lenses of gauges, watches, and clocks.

The invention is further illustrated by the following non-limiting examples.

EXAMPLES

Table 1 provides the abbreviation, chemical description, and source of the various polymers used in the multilayer thermoplastic film constructions described in the examples below.

TABLE 1

| Abbreviation | Chemical Description | Source/Vendor |
| --- | --- | --- |
| BPA-PC | Polycarbonate homopolymer derived from bisphenol A; Mw (PC) = 30,000 g/mol | SABIC Innovative Plastics |
| DMBPC-PC (25K) | Polycarbonate homopolymer derived from a bisphenol cyclohexylidene of formula (VII); Mw (PC) = 24,000-26,000 g/mol, target 25,000 g/mol | SABIC Innovative Plastics |

TABLE 1-continued

| Abbreviation | Chemical Description | Source/Vendor |
|---|---|---|
| DMBPC-PC (21K) | Polycarbonate homopolymer derived from a bisphenol cyclohexylidene of formula (VII); Mw (PC) = 20,000-22,000 g/mol, target 21,000 g/mol) | SABIC Innovative Plastics |
| DMBPC-BPA | Polycarbonate copolymer derived from bisphenol cyclohexylidene of formula (VII) and bisphenol A in a mole ratio of 1:1; Mw (PC) = 23,300 g/mol | SABIC Innovative Plastics |
| Terpolymer A (BPA/MeHQ/HQ) | Polycarbonate terpolymer derived from bisphenol A, methyl hydroquinone, and hydroquinone (BPA/MeHQ/HQ) in a mole ratio of BPA:MeHQ:HQ of 33:33:34; Mw (PC) = 26,000 g/mol. | SABIC Innovative Plastics |
| Terpolymer B (DMBPC/MeHQ/HQ) | Polycarbonate terpolymer derived from a bisphenol cyclohexylidene of formula (VII), methyl hydroquinone, and hydroquinone (DMBPC/MeHQ/HQ) in mole ratio of DMBPC:MeHQ:HQ of 33:33:34; Mw (PC) = 30,100 g/mol | SABIC Innovative Plastics |
| PCCD | Poly(1,4-cyclohexylidene cyclohexane-1,4-dicarboxylate) | Eastman Chemical, Kingsport, Tenn. |
| TBPH | Tetrabutylphosphonium hydroxide (40 wt. % in $H_2O$) | Sachem Inc. |

Mw = weight average molecular weight, as measured by GPC, based on polycarbonate (PC) standards.

Unless specifically stated to the contrary, all properties set forth in this application were determined as set forth below.

Pencil hardness was determined according to ASTM D3363-05 with a 500-gram-force (gf) load when testing the first layer of the extruded bilayer films or with a 1 kgf load when testing molded samples.

The scratch resistance of the first layer as reported in Table 5 was determined with two instruments, a custom-built scratch tester using an applied force of 6N to form an indentation parting the surface of the sample, and a 3D Kosaka to measure the scratch depth. The extent of the indentation was measured (with a 3D Kosaka device run in 2D mode using a measurement force of 50 milliNewtons) from the bottom of the indentation to the surface.

Scratch resistance as reported in Tables 7-9 was determined on molded samples using an Erichsen Scratch Tester Type 413 according to ISO 1518, by applying a force of 6 N to a conical stylus with radius of 0.01 millimeter (mm), to form an indentation parting the surface of the sample. The extent of the indentation was subsequently measured by a Dektak® 6M profilometer and was reported as the height of the indentation measured from the bottom of the indentation to the surface.

Tear initiation and propagation strengths in Newtons per millimeter (N/mm) were measured according to ASTM D1004-03 and D1938-02, respectively, as indicated in the Tables.

Tensile strength, which was expressed as modulus (MPa), stress at yield and at break (MPa) and strain at yield and break (%), were determined according to ISO 527 at a strain rate of 50 mm/min.

Light transmission and haze were measured in accordance with ASTM D 1003-00 Procedure A with a HAZE-GUARD DUAL from BYK-Gardner, using an integrating sphere (0°/diffuse) geometry, wherein the spectral sensitivity conforms to the CIE standard spectral value under standard lamp D65. Light transmission as reported in Table 6. was measured on a 0.32 mm thick coextruded film sample. Light transmission and haze as reported in Table 7 was measured on a 3.2 millimeter (mm) thick sample.

MVR (melt volume rate) at 300° C., 1.2 kilograms (kg) and 4 minutes (min) was evaluated in accordance with ISO 1133.

Izod, notched and unnotched, were measured on molded, 3 or 4 mm thick samples in accordance with ISO 180 under 1/A at 23° C.

Multi-axial impact properties, which are expressed as maximum force (N), energy at maximum (max) in joules (J), energy at break in joules, deflection at break in millimeters, and fracture mode (ductile or brittle), was determined in accordance with ISO 6603-2.

Environmental stress cracking (ESCR) was performed using tensile bars. For each sample, 5 tensile bars were positioned in metal strain jigs providing 0.5% strain. For a period of 5 minutes the bars were kept wet with Fuel-C (50/50 volume % mixture of toluene with iso-octane (2,2,4-trimethylpentane)). After this, the bars were submerged in water and released from the strain jig. After the bars were dried with paper towels they were stored in a polyethylene bag. The next day tensile properties were measured in accordance with ISO 527, at 50 mm/min. The retention of elongation, stress cracking, and visual appearance were then evaluated.

Examples 1-4 and A-D

Bilayer thermoplastic films were prepared using varying compositions in the first layer (Examples 1-4 and A-D in Table 2) and a bisphenol A homopolycarbonate in the second layer. Examples A-D are comparative examples. The films were prepared using coextrusion to a total gauge of 10 mils (254 micrometers).

TABLE 2

| Ex. | Thickness of first layer (%)* | Composition of first layer | DMBPC (wt. %)** | (Me)HQ (wt. %)** |
|---|---|---|---|---|
| 1 | 30 | Terpolymer A (BPA/MeHQ/HQ) | 0 | 53 |
| 2 | 30 | Terpolymer B (DMBPC/MeHQ/HQ) | 53 | 47 |
| 3 | 30 | Terpolymer A/DMBPC-PC (25K) in a 50/50 weight ratio | 50 | 27 |
| 4 | 30 | Terpolymer A/DMBPC-BPA in a 10/90 weight ratio | 50 | 5 |
| A | 30 | DMBPC-PC (25K) | 100 | 0 |
| B | 30 | DMBPC-PC (25K)/BPA-PC in 50/50 weight ratio | 50 | 0 |

TABLE 2-continued

| Ex. | Thickness of first layer (%)* | Composition of first layer | DMBPC (wt. %)** | (Me)HQ (wt. %)** |
|---|---|---|---|---|
| C | 30 | DMBPC-PC/PCCD in 60/40 weight ratio | 60 | 0 |
| D |  | BPA-PC | 0 | 0 |

*Based on total thickness
**Based on total formulation weight. (Me)HQ is the total of both hydroquinone and methylhydroquinone in the formulation.

In particular, coextruded bilayer thermoplastic films having a first layer containing the various compositions shown in Table 2 and a second layer, made from a commercially available bisphenol A-based polycarbonate from SABIC Innovative Plastics) were made via a continuous calendaring co-extrusion process. Co-extrusion consisted of a melt delivery system via a set of extruders each supplying the molten polymer for the individual layers. These melt streams were then fed into a feed block and then a die which formed a molten polymeric web that fed a set of calendaring rolls, which opposing rolls were made from steel and rubber-covered steel and were internally heated or cooled for temperature control. The molten web was successively squeezed between these rolls. The inter-roll clearances or "nips" through which the polymers were drawn through determined the thicknesses of the films As an illustration, the process conditions corresponding to Sample 3 in Table 2 above are provided in Table 3. It is understood that the process window for extruding these films is not restricted to that illustrated in Table 3. One objective of Example 1 was to determine whether or not there exists a condition at which these coextruded films could be made, i.e., whether or not these films are coextrudable. Thus, Table 3 below merely provides one set of run conditions for coextruding these films.

TABLE 3

| Main Extruder diameter | 1.75 inches (4.44 cm) |
|---|---|
| Coextruder Diameter | 1.25 inches (3.18 cm) |
| Main Extruder End Zone Temp (° F.) | |
| Zone 1/Zone 2/Zone 3 | 485/500/515° F. (252/260/268° C.) |
| Main Extruder Melt Temp at exit | 529° F. (276° C.) |
| Coextruder End Zone Temp (° F.) | |
| Zone 1/Zone 2/Zone 3 | 470/485/500° F. (243/252/260° C.) |
| Coextruded Melt Temp at exit | 520° F. (271° C.) |
| RPM[1] (Main/Coex) | (40.5)/49 |
| Feedblock | 525° F. (274° C.) |
| Die Temp (° F.) (3 zones) | 530°/530°/530° F. (277/277/277° C.) |
| Roll Temp (Top/Bottom) (° F.) | 210°/250° F. (99/121° C.) |

[1]RPM—revolutions per minute

Examples 1-4 and A-D were tested for: (1) IMD processability, (2) mechanical properties, and (3) chemical resistance. Articles suitable for IMD applications are amenable to the three sub-processes of IMD: (a) extrudability, the ability to make films out of the selected materials, at a surface quality comparable to commercially available polished graphic films; (b) formability, the ability to draw the films into different geometries; and (c) trimmability, the ability to cut the film cleanly without inducing any cracking or delamination.

Examples 1-4 and A-D were evaluated for surface quality, formability, and trimmability. Results are shown in Table 4.

To measure surface quality, specimens of each of the coextruded films of Examples 1-4 and A-D (12 inches×12 inches (30.5 cm×30.5 cm)) were visually examined using the unaided eye to identify any gross imperfections (e.g., lines, dents, bumps) of greater than 2 mm in length. Each specimen was rated on a scale of 1 (worst) to 5 (best). Absence, to the unaided eye, of any such imperfection was given a rating 5. This evaluation was not intended to test the optical quality of the films, but instead to identify any gross imperfections that might arise during film co-extrusion. The "unaided eye" in these tests excludes the use of optical devices for magnification with the exception of corrective lenses needed for normal eyesight.

To test formability, specimens of each of the coextruded films of Examples 1-4 and A-D (12 inches×12 inches (30.5 cm×30.5 cm)) of the coextruded film were preheated to 140° C. and then vacuum formed on a COMET Thermoformer, with the male forming tool at 120° C., a minimum curvature of 5 mm, and maximum draw of 10 mm. The thermoformed films were visually examined using the unaided eye to detect wrinkles, whitening, or tears on the film arising during the thermoforming process. Each specimen was rated on a scale of 1 to 5 (5 being free of deformations).

To test for trimmability, specimens of each of the thermoformed, coextruded films of Examples 1-4 and A-D were trimmed using matched metal dies comprising hardened male and female die halves (American Iron and Steel Institute "AISI" Type A2 steel), with a clearance between the male die half and female die half of 10% of sheet thickness, wherein the part was at a 90 degree angle to the blade at the time of impact. Multilayer films with poor interlayer adhesion tend to delaminate during this step. The appearance of any signs of cracking or any visible delamination during this step was also observed visually by the unaided eye and rated on a scale of 1 to 5 (where 5 meant no defects).

TABLE 4

| Attributes | 1 | 2 | 3 | 4 | A | B | C | D |
|---|---|---|---|---|---|---|---|---|
| Film extrudability/Surface Quality | 5 | 5 | 5 | 5 | 5 | 5 | 5 | 5 |
| Formability Rating | 5 | 5 | 5 | 5 | 5 | 5 | 5 | 5 |
| Trimmability Rating | 5 | 5 | 5 | 5 | 1 | 3 | 5 | 5 |

The results in Table 4 show that overall, Examples 1-4 have comparable or improved properties compared to Examples A-B. Examples 1-4 and A-D are both extrudable and formable, measured as described above. Examples 1-4 and C-D are also highly trimmable. Neither Examples A nor B have satisfactory trimmability. All samples had comparable transmission values. Thus, blends containing either Terpolymer A or Terpolymer B, or blends of Terpolymer A with a DMBPC-PC or DMBPC-BPA would provide multilayer films with excellent properties.

Films containing Examples 1-4 and A-D were further evaluated for mechanical properties, in particular pencil hardness, scratch resistance, crack resistance, tear initiation strength, and tear propagation strength. The results of the testing are shown in Table 5.

TABLE 5

|  | 1 | 2 | 3 | 4 | A | B | C | D |
|---|---|---|---|---|---|---|---|---|
| Pencil Hardness - 500 g | HB | H | 2H | H | 3H | H | H | 6B |
| Scratch Depth (μm) | 0.72 | 0.40 | 0.27 | 0.67 | 0.17 | 0.38 | 0.36 | 1.62 |

TABLE 5-continued

|  | 1 | 2 | 3 | 4 | A | B | C | D |
|---|---|---|---|---|---|---|---|---|
| Tear Initiation Strength (N/mm) | 237 | 238 | 290 | 247 | 235 | 234 | 223 | 240 |
| Tear Propagation Strength (N/mm) | 12 | 13 | 9 | 9 | 8 | 10 | 12 | 6 |
| Tensile Modulus (MPa) | 2165 | 2264 | 2286 | 2463 | 2293 | 2107 | 2181 | 2100 |

Based on the results in Table 5, it is evident that compared to Example D, the hardness gain in Examples 2, 3 and 4 did not compromise the tear resistance of the Examples. In terms of pencil hardness, Example 3, in particular, was superior to Examples B and C, while Examples 2 and 4 were comparable to Examples B and C. Examples 2, and 3 also exhibited a scratch depth of 0.40 micrometers or less. In view of both formability properties and mechanical properties in combination, it can be seen that the compositions of Examples 2, 3 and 4 are superior overall. Example 1 is less suitable where very good scratch resistance is desired.

Examples 1-4 and A-D were evaluated for chemical and crack resistance. In particular, A4 sized sheets of each sample were obtained. Pads (3M®) soaked in each chemical were placed near the center of the sheets. The exposed sheet was set aside for 1 hour at 72° F. (22.2° C.), after which the Examples were observed, with the unaided eye, for any signs of solvent attack such as cracking and/or staining. The light transmission of the 0.32 mm thick coextruded film Examples before and after chemical exposure was determined according to ASTM D1003-00. The results are shown in Table 6.

Example 2), or blended with a copolymer comprising units derived from monomers (II), (III), and (IV), wherein monomer (IV) is not a bisphenol cyclohexylidene (as in Example 3 and 4). Terpolymer A alone (Example 1), which has no repeat units from a bisphenol cyclohexane, did not provide as much hardness as Examples 2 and 3, although superior chemical (crack) resistance was obtained. More ductile samples, thus less notch sensitive material should be better in ESCR as notch-sensitive materials can more quickly lead to catastrophic failure during crack propagation when exposed to chemicals.

The contribution of units derived from the dihydroxy compounds (II) and (III) is seen in the comparisons with Examples A and B. Example A, with a first layer comprising a polycarbonate having 100% repeat units derived from a bisphenol cyclohexane, fails when exposed to gasoline. Example B, with a first layer comprising a polycarbonate having repeat units derived from a bisphenol cyclohexylidene and bisphenol A, also cracks after exposure to gasoline. Thus, the chemical resistance data in Table 6 clearly demonstrates

TABLE 6

|  |  | 1 | 2 | 3 | 4 | A | B | C | D |
|---|---|---|---|---|---|---|---|---|---|
| Initial light transmission |  | 91.0 | 91.1 | 92.1 | 91.2 | 91.7 | 91.3 | 91.5 | >90 |
| Light Transmission after 1 hr exposure | Fantastik ® Spray Cleaner | 91.2 | 91.1 | 91.9 | 91.2 | 91.4 | 91.3 | 91.7 | Haze |
|  | Coppertone ® SPF 45 Suntan Lotion | 91.1 | 90.8 | 91.6 | 88.8 | 91.2 | 91.4 | 91.9 | Haze |
|  | Vegetable Oil | 92.7 | 92.2 | 92.7 | 91.2 | 91.9 | 91.8 | 92.5 | Haze |
|  | Gasoline | 91.2 | 91.8 | 91.5 | 84.9 | Cracks | Cracks | Cracks | Cracks |

As seen in Table 6 above, Comparative Examples A-D suffered serious surface damage when exposed to gasoline. In comparison, Examples 1-4 had no cracking, and practically no change in appearance or light transmission. Examples 1-4 therefore have improved chemical resistance over Examples A-D. The decrease in light transmission of Examples 1-3 was less than 1%.

Examples 1-4, based on the results in Table 6 above, are excellent films for IMD applications where chemical resistance is highly desirable, such as gas pump overlays, kitchen appliances, and the like. In an advantageous feature, the unique functionality of films IMD film lies in their multilayer construction, which results in two surfaces with contrasting chemical properties. For example, as illustrated by Examples 1-4, the top surface of the films can be engineered to be resistant to chemicals, thereby protecting the article against solvent attack. The bottom surface, in contrast, can be a polycarbonate amenable to partial dissolution by solvents, for example those found in commercially available ink systems, which is desirable for printing graphics in IMD applications.

Use of the two layers as described herein further allows the properties of the films to be tailored to meet specific application needs. Thus, when the first layer comprises a polycarbonate having repeat units derived from a bisphenol cyclohexane, the resulting film has excellent scratch resistance in addition to chemical and crack resistance. The repeat units derived from a bisphenol cyclohexylidene can be either copolymerized with monomers (II) and (III) (as in Terpolymer B, that the presence of Terpolymer A or Terpolymer B improves chemical resistance to gasoline.

In view of the above results in Tables 4, 5, and 6, the multilayer thermoplastic films disclosed herein can achieve a superior set of desired properties while maintaining formability. The multilayer thermoplastic films are able to provide, in one piece at the same time, a set of properties including desired chemical and crack resistance, scratch resistance, and/or mechanical strength or robustness.

Examples 5-11

Examples 5-11 show the properties of a polycarbonate blend intended for use as the first layer of a multilayer thermoplastic film. None of the Examples contained a catalyst during manufacture of the polycarbonate blend.

The compositions were extruded on a Krupps Werner+ Pfleiderer ZSK25 twin screw extruder (screw diameter: 25 mm) at a screw velocity of 300 rpm and melt temperature of 300° C. The obtained granulate was then molded on an Engel 110 molding machine. Parts molded for testing included 3.2 mm disks (diameter: 10 cm), and impact and tensile bars. The molding conditions were as follows: hopper: 40° C.; zone 1: 280° C.; zone 2: 290° C.; zone 3: 300° C.; die: 295° C.; mold; 80° C. The cooling time was 20 seconds, the cycle time was 38 seconds, and the injection speed was 25 mm/s.

Compositions and results are shown in Table 7.

TABLE 7

| Components | 5A* | 5B* | 6 | 7 | 8 | 9 | 10 | 11 |
|---|---|---|---|---|---|---|---|---|
| Terpolymer A (BPA/MeHQ/HQ) (wt. %) | 0 | 0 | 5 | 10 | 20 | 0 | 0 | 0 |
| Terpolymer B (DMBPC/MeHQ/HQ) (wt. %) | 0 | 0 | 0 | 0 | 0 | 5 | 10 | 20 |
| DMBPC-BPA (wt. %) | 100 | 0 | 95 | 90 | 80 | 95 | 90 | 80 |
| BPA-PC (wt.. %) | 0 | 100 | — | — | — | — | — | — |
| Wt. % DMBPC in formulation | 56 | — | 53 | 50 | 45 | 56 | 56 | 55 |
| Wt. % (Me)HQ in formulation | 0 | — | 3 | 5 | 11 | 2 | 5 | 9 |
| Erichsen scratch (μm) 6 N | 11.9 | 21.5 | 12.3 | 12.4 | 12.8 | 12.1 | 11.5 | 11.4 |
| Pencil Hardness test, 1 kgf | H | 2B | H | F | F | H | H | H |
| Light Transmission (%) | 90.7 | 90.9 | 90.3 | 89.8 | 88.6 | 90.6 | 90.7 | 90.5 |
| Haze (%) | 0.7 | 0.4 | 1.8 | 3.1 | 5.2 | 0.7 | 0.7 | 0.6 |
| MVR (300° C./1.2 kg/4 min) | 13.1 | 7.0 | 12.7 | 12.2 | 11.9 | 12.7 | 13.3 | 13.7 |
| Vicat B120 | 140 | 145 | 140 | 139 | 138 | 139 | 136 | 138 |
| Izod notched impact (kJ/m$^2$) | 5 | 70 | 5 | 5 | 6 | 5 | 5 | 5 |
| Izod unnotched impact (kJ/m$^2$) | 114 | NB | NB | 194 | NB | 213 | 200 | 183 |
| Multi-axial Impact | | | | | | | | |
| Energy at Max. (J) | 3 | 131 | 12 | 65 | 71 | 3 | 18 | 4 |
| Energy at Break (J) | 3 | 137 | 12 | 70 | 73 | 3 | 19 | 4 |
| Deflection at Break (mm) | 4 | 21 | 5 | 12 | 13 | 3 | 6 | 3 |
| Fracture mode (D)/(B) | 5xB | 5xD | 2xD/3xB | 5xD | 5xD | 5xB | 3xD/2xB | 5xB |

*Comparative Example

The results in Table 7 show that show that a DMBPC-BPA material shows a good scratch performance with a pencil hardness of H, but impact properties such as Izod and multi-axial impact are poor. Addition of either terpolymer A or terpolymer B partly improves the impact properties as shown by the increase in the Izod unnotched impact to more than 120 kJ/m2, even showing a rating of NB for Examples 6 and 8. Addition of greater than 5 wt. % of Terpolymer A additionally improves the multi-axial ductility in blends with DMBPC-BPA demonstrated in the increase in energy at maximum load and by an increase in the amount of ductile type failures.

For all of these blends, the scratch performance is maintained at a level of at least F when measured at 1 kgf, making these blends very suitable for the use in both injection mold applications as well as in film applications that require both scratch resistance as well as an improved impact performance.

Examples 12-29

Examples 12-29 were prepared as described for examples 7-16, and show the properties of a polycarbonate blend intended for use as the first layer of a multilayer thermoplastic film. None of the Examples contained a catalyst during manufacture of the polycarbonate blend. Compositions and results are shown in Table 8.

TABLE 8

| | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|
| Component | | | | | | | | | | | | | | | | | | |
| Terpolymer A (BPA/MeHQ/HQ) (wt. %) | 60 | 50 | 40 | 30 | 20 | 10 | 60 | 50 | 40 | 30 | 20 | 10 | — | — | — | — | — | — |
| Terpolymer B (DMBPC/MeHQ/HQ) (wt. %) | — | — | — | — | — | — | — | — | — | — | — | — | 60 | 50 | 40 | 30 | 20 | 10 |
| DMBPC-PC (21K) (wt. %) | 40 | 50 | 60 | 70 | 80 | 90 | — | — | — | — | — | — | — | — | — | — | — | — |
| DMBPC-PC (25K) (wt. %) | — | — | — | — | — | — | 40 | 50 | 60 | 70 | 80 | 90 | 40 | 50 | 60 | 70 | 80 | 90 |
| Wt. % DMBPC in formulation | 40 | 50 | 60 | 70 | 80 | 90 | 40 | 50 | 60 | 70 | 80 | 90 | 72 | 76 | 81 | 86 | 91 | 95 |
| Wt. % (Me)HQ in formulation | 32 | 27 | 21 | 16 | 11 | 5 | 32 | 27 | 21 | 16 | 11 | 5 | 28 | 24 | 19 | 14 | 9 | 5 |
| Properties | | | | | | | | | | | | | | | | | | |
| Erichsen scratch (μm) 6 N | 12.6 | 11.2 | 10.9 | 9.9 | 9.6 | 8.6 | 11.8 | 11.3 | 10.8 | 10.1 | 9.2 | 8.8 | 8.7 | 8.6 | 8.4 | 8.9 | 9.3 | 8.6 |
| Pencil Hardness test, 1 kgf | F | F | H | H | H | H | F | H | H | H | H | H | H | H | H | H | H | H |
| Light Transmission (%) | 87.3 | 87.8 | 88.1 | 88.3 | 88.6 | 89.5 | 87.4 | 88.0 | 88.3 | 88.2 | 88.6 | 89.4 | 88.7 | 88.3 | 88.3 | 88.9 | 89.6 | 89.7 |
| Haze (%) | 5.5 | 4.8 | 6.9 | 8.4 | 5.1 | 2.5 | 6.8 | 3.4 | 4.3 | 5.1 | 3.9 | 2.0 | 0.8 | 1.0 | 1.4 | 1.5 | 1.3 | 1.0 |
| MVR (300° C./1.2 kg/4 min) | 10.8 | 11.2 | 10.8 | 10.5 | 10.9 | 10.9 | 10.2 | 8.7 | 8.3 | 6.9 | 6.7 | 6.8 | 13.6 | 12.9 | 11.9 | 9.5 | 8.8 | 7.4 |
| Vicat B120 | 129 | 131 | 132 | 134 | 135 | 137 | 129 | 131 | 133 | 135 | 137 | 138 | 127 | 128 | 138 | 134 | 135 | 137 |
| Izod notched impact (kJ/m$^2$) | 7 | 7 | 51 | 6 | 5 | 8 | 7 | 6 | 6 | 5 | 5 | 5 | 7 | 5 | 6 | 3 | 3 | 3 |
| Izod unnotched impact (kJ/m$^2$) | NB | NB | 217 | NB | 136 | 55 | 223 | NB | NB | NB | 211 | 62 | NB | — | 108 | 166 | 55 | 41 |

TABLE 8-continued

| | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|
| Multi-axial Impact | | | | | | | | | | | | | | | | | | |
| Energy at Max. (J) | 55 | 106 | 38 | 3 | 2 | 2 | 106 | 117 | 81 | 10 | 3 | 3 | 4 | 3 | 2 | 3 | 3 | 3 |
| Energy at Break (J) | 59 | 113 | 39 | 3 | 2 | 2 | 115 | 126 | 88 | 10 | 3 | 3 | 4 | 3 | 2 | 3 | 3 | 3 |
| Deflection at Break (mm) | 11 | 16 | 8 | 2 | 3 | 3 | 16 | 17 | 13 | 4 | 3 | 4 | 3 | 4 | 3 | 4 | 4 | 4 |
| Fracture mode (D)/(B) | 5xD | 5xD | 5xD | 5xB | 5xB | 5xB | 5xD | 5xD | 5xD | 1xD/4xB | 5xB | 5xB | 5xB | 5xB | 5xB | 5xB | 5xB | 5xB |

NB—not broken (at >137 kJ/m$^2$)

The results in Table 8 show that specifically adding 40-60 wt. % of terpolymer A improves multi axial impact properties of DMBPC-PC blends. Furthermore, using higher Mw DMBPC-PC, improved impact properties are obtained than when using low Mw DMBPC-PC.

Examples 30-41

Examples 30-41 were prepared as described for examples 7-16, and show the properties of a polycarbonate blend intended for use as the first layer of a multilayer thermoplastic film. A catalyst (TBPH, solution contains 40 wt. % TBPH in water) is present in Examples 32-41.

Properties were evaluated for each of the Examples 30-41, the results of which are shown in Table 9.

properties. When adding too much of the catalyst (Example 34), the advantage of the improved chemical resistance may be counteracted by the possible degradation of the polymer backbone due to the presence of a too high level of acid.

Examples 32-38 exhibited enhanced multi-axial properties, including: (i) an energy at maximum load of greater than or equal to 20 J, specifically greater than or equal to 70 J, and more specifically greater than or equal to 90 J; Furthermore at greater than 10 wt. % of terpolymer A, the unnotched impact improved compared to DMBPC-PC.

The foregoing Examples show generally that in a blend of two polymers, an increased amount of a HQ/MeHQ/BPA terpolymer, will improve impact properties and chemical resistance, whereas an increased amount of DMBPC-PC will improve hardness. Use of a catalyst such as TBPH will

TABLE 9

| Components | 30* | 31A* | 31B* | 32 | 33 | 34 | 35 | 36 | 37 | 38 | 39 | 40 | 41 |
|---|---|---|---|---|---|---|---|---|---|---|---|---|---|
| Terpolymer A (BPA/MeHQ/HQ) (wt. %) | 100 | 0 | 0 | 50 | 50 | 50 | 50 | 60 | 75 | 90 | 10 | 25 | 40 |
| DMBPC-PC (25K) (wt. %) | 0 | 100 | 0 | 50 | 50 | 50 | 50 | 40 | 25 | 10 | 90 | 75 | 60 |
| BPA-PC | — | — | 100 | — | — | — | — | — | — | — | — | — | — |
| TBPH solution (wt. %) | 0 | 0 | 0 | 0 | 0.002 | 0.01 | 0.004 | 0.004 | 0.004 | 0.004 | 0.004 | 0.004 | 0.004 |
| Wt. % DMBPC in formulation | 0 | 100 | 0 | 50 | 50 | 50 | 50 | 40 | 25 | 10 | 90 | 75 | 60 |
| Wt. % (Me)HQ in formulation | 53 | 0 | 0 | 27 | 27 | 27 | 27 | 32 | 40 | 48 | 5 | 13 | 21 |
| Erichsen scratch (μm) 6 N | 16.4 | 8.5 | 21.5 | 12.3 | 13.2 | 13.1 | 12.9 | 13.6 | 15.2 | 15.7 | 9.2 | 10.2 | 12.1 |
| Light Transmission (%) | 83.3 | 89.8 | 90.9 | 86.4 | 85.8 | 86.2 | 86.2 | 85.1 | 84 | 83.7 | 89 | 86.8 | 86.3 |
| Haze (%) | 1.1 | 0.7 | 0.4 | 7.5 | 5.4 | 2.6 | 5.4 | 6.2 | 4.7 | 1.0 | 4.2 | 5.8 | 6.9 |
| MVR (300° C./1.2 kg/4 min) | 5.8 | 6.9 | 7.0 | 14.1 | 13.6 | 20.3 | 14.7 | 18.8 | 17.4 | 14.5 | 9.5 | 10.6 | 13.9 |
| ESCR (50% toluene/50% iso-octane, 5 min, 0.5% strain) | Good** | Cracks in 2 seconds | Crack in 2 seconds | Severe staining | Staining | Cracks in 8 seconds | Some staining | Some staining | Good* | Good* | Cracks in 2 seconds | Cracks in 9 seconds | Severe Staining |
| Vicat B120 | 125 | 139 | 145 | 132 | 131 | 130 | 130 | 129 | 127 | 125 | 137 | 135 | 132 |
| Izod notched impact (kJ/m$^2$) | 48 | 2 | 70 | 5 | 4 | 3 | 4 | 4 | 6 | 10 | 2 | 2 | 3 |
| Izod unnotched impact (kJ/m$^2$) | NB | 26 | NB | NB | NB | NB | NB | NB | NB | NB | 33 | 105 | NB |
| Multi-axial Impact | | | | | | | | | | | | | |
| Energy at Max. (J) | 92 | 3.5 | 131 | 48 | 31 | 24 | 32 | 55 | 73 | 99 | 3 | 3 | 20 |
| Energy at Break (J) | 96 | 4 | 137 | 50 | 32 | 25 | 33 | 56 | 77 | 104 | 3 | 3 | 21 |
| Deflection at Break (mm) | 16 | 4 | 21 | 10 | 8 | 7 | 8 | 11 | 13 | 16 | 4 | 3 | 7 |
| Fracture mode (D)/(B) | 5xD | 5xB | 5xD | 5xD | 4xD/1xB | 4xD/1xB | 5xD | 5xD | 5xD | 5xD | 5xB | 5xB | 4xD/1xB |

*Comparative Examples;
**No staining or cracking to the unaided eye;
NB—not broken (at >137 kJ/m$^2$)

As can be seen from Table 9, Examples 33 and 35, comprising the catalyst (0.002 and 0.004 wt. %), exhibited less staining compared to a blend without the catalyst (Example 32), i.e., little or no staining versus severe staining, and no cracking, while substantially retaining many of the other improve resin compatibility, although it has been found that too high an amount will result in decreased molecular weight, which leads to increased MVR. This would be undesirable for extrusion applications. However, materials with these high MVR could still be used for injection molding processes.

Ranges disclosed herein are inclusive of the recited endpoint and are independently combinable (e.g., ranges of "up to 25 wt. %, or, more specifically, 5 wt. % to 20 wt. %", is inclusive of the endpoints and all values between the recited endpoints). "Combination" is inclusive of blends, mixtures, derivatives, alloys, reaction products, and so forth. The terms "first," "second," and so forth, herein do not denote any order, quantity, or importance, but rather are used to distinguish one element from another, and the terms "a" and "an" do not denote a limitation of quantity, but rather denote the presence of at least one of the referenced item. Optional" or "optionally" means that the subsequently described event or circumstance can or cannot occur, and that the description includes instances where the event occurs and instances where it does not. The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A multilayer thermoplastic film comprising:
a first layer comprising a first polycarbonate polymer that comprises repeat units derived from monomers (II), (III), and (IV), wherein
monomer (II) is a first dihydroxy compound of the formula:

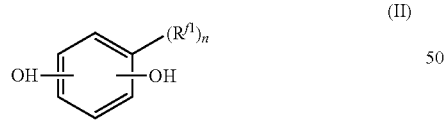

(II)

wherein n is 0 to 4, and $R^{f1}$ is a halogen, a $C_{1-10}$ hydrocarbon group, or a $C_{1-10}$ halogen-substituted hydrocarbon group;
monomer (III) is a second dihydroxy compound not the same as monomer (II) and of the formula:

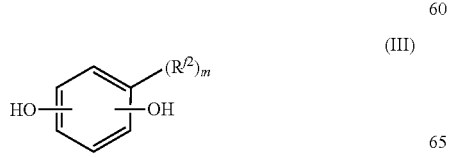

(III)

wherein m is 1 to 4, and $R^{f2}$ is a halogen, a $C_{1-10}$ hydrocarbon group, or a $C_{1-10}$ halogen-substituted hydrocarbon group; and
monomer (IV) is a third dihydroxy compound of the formula:

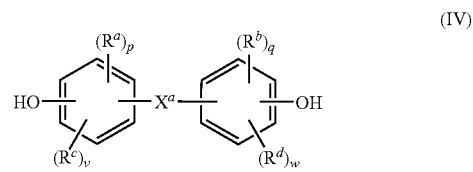

(IV)

wherein $R^a$ and $R^b$ are each independently a halogen or $C_{1-12}$ alkyl group that is meta to the hydroxy group on the same aromatic ring; $R^c$ and $R^d$ each independently represent a $C_1$-$C_{12}$ alkyl group that is ortho to the hydroxy group on the same ring; p and q are each independently integers of 0 to 2; v and w are each independently integers 0 to 2; and $X^a$ is a single bond or a bridging group;
wherein
the sum of the mole percent of the repeat units derived from monomers (II) and (III) is greater than or equal to 30 mole percent, based on the total moles of the repeat units derived from monomers (II), (III), and (IV) in the first polycarbonate polymer,
the mole percent of the repeat units derived from monomer (IV) is 5 to 70 mole percent, based on the total moles the repeat units derived from monomers (II), (III), and (IV), and
the total wt. % of the repeat units derived from monomers (II), (III), and (IV) is greater than or equal to 80 wt. % of the first polycarbonate polymer;
an additional polycarbonate polymer that is not the same as the first polycarbonate polymer, wherein the additional polycarbonate polymer comprises
50 to 100 mole percent of repeat units derived from a bisphenol cyclohexane of the formula (VI):

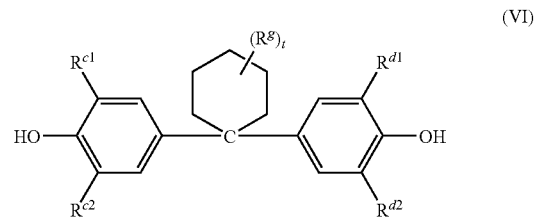

(VI)

wherein $R^{c1}$ and $R^{d1}$ are each independently $C_{1-12}$ alkyl, $R^{c2}$ and $R^{d2}$ are each independently hydrogen or $C_{1-12}$ alkyl, $R^g$ is $C_{1-12}$ alkyl or halogen, and t is 0 to 10; and
0 to 50 mole percent of repeat units derived from a dihydroxy aromatic compound of formula (VIII):

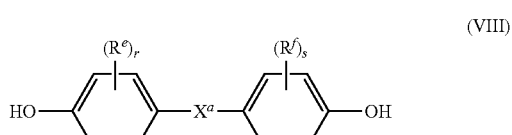

(VIII)

wherein $R^e$ and $R^f$ are each independently a halogen or $C_{1-10}$ alkyl group; r and s are each independently integers of 0 to 4; $X^a$ is a single bond or a bridging group connecting the two hydroxy-substituted aromatic groups; and the dihydroxy aromatic compound of formula (VIII) is not the same as the bisphenol cyclohexylidene of formula (VI); and 0.002 wt. % to 0.07 wt. % of a catalyst for the reaction of the first polycarbonate polymer and the additional polycarbonate polymer, based on the total weight of the polycarbonate polymers; and a second layer in contact with the first layer, wherein the second layer comprises a second polycarbonate polymer that is not the same as the first polycarbonate polymer in the first layer.

2. The multilayer thermoplastic film of claim 1, wherein the first layer exhibits at least one of the following properties: a pencil hardness of greater than or equal to 2B, as measured by ASTM D3363-05, and a scratch depth of less than or equal to 0.8 micrometers, measured using a force of 6 N.

3. The multilayer thermoplastic film of claim 1, wherein the film exhibits a light transmission of greater than or equal to 60% as measured by ASTM D1003-00 for a multilayer film having a thickness of 0.32 mm; a tear initiation strength of greater than or equal to 235 N/mm as measured by ASTM D1004-03; a tear propagation strength of greater than or equal to 8.5 N/mm as measured by ASTM D1938-02; and a tensile modulus of greater than or equal to 2000 MPa as measured by ISO 527.

4. The multilayer thermoplastic film of claim 1, wherein the film exhibits, to the unaided eye, no cracks when exposed to gasoline for 1 hour at 22° C.

5. The multilayer thermoplastic film of claim 1, wherein monomer (II) is hydroquinone and monomer (III) methyl hydroquinone.

6. The multilayer thermoplastic film of claim 1, wherein the monomer (IV) is 1 to 99 mole percent of the bisphenol cyclohexylidene of formula (VI) and 1 to 99 mole percent of a monomer of formula (IV) that is not the same as the bisphenol cyclohexylidene of the formula (VI).

7. The multilayer thermoplastic film of claim 1, wherein monomer (IV) is 1 to 99 mole percent of dimethyl bisphenol cyclohexane and 1 to 99 mole percent of bisphenol A.

8. The multilayer thermoplastic film of claim 1, wherein monomer (IV) is 100 mole percent of the bisphenol cyclohexylidene of the formula (VI).

9. The multilayer thermoplastic film of claim 1, wherein monomer (IV) is 100 mole percent of bisphenol A.

10. The multilayer thermoplastic film of claim 1, comprising 5 to 95 wt. % of the first polycarbonate polymer and 5 to 95 wt .% of the additional polycarbonate polymer, based on the total weight of first and additional polycarbonate polymers.

11. The multilayer thermoplastic film of claim 1, comprising 5 to 60 wt. % of the first polycarbonate polymer and 40 to 95 wt. % of the additional polycarbonate polymer, based on the total weight of first and additional polycarbonate polymers.

12. The multilayer thermoplastic film of claim 1, comprising forming the first layer from a melt-blended composition comprising the first polycarbonate polymer, the additional polycarbonate polymer, and the catalyst, based on a total weight of the polycarbonate polymers in the composition.

13. A molded article comprising the multilayer thermoplastic film of claim 1, in combination with an injection molded polymeric base to which the film is bonded, wherein the multilayer thermoplastic film has been formed into a non-planar three-dimensional shape matching a three-dimensional shape of the injection molded polymeric base structure, and wherein the film further comprises a printed marking.

14. The multilayer thermoplastic film of claim 1, wherein the film exhibits a light transmission of greater than or equal to 90%, as measured in accordance with ASTM D1003-00 for a multilayer film having a thickness of 0.32 mm.

15. A multilayer thermoplastic film comprising:
a first layer comprising the reaction product of a first polycarbonate polymer and an additional polycarbonate polymer not the same as the first polycarbonate polymer in the presence of 0.002 wt. % to 0.07 wt. % of a catalyst based on a total weight of the polycarbonate polymers, wherein the first polycarbonate polymer comprises repeat units derived from monomers (II), (III), and (IV), wherein monomer (II) is a first dihydroxy compound of the formula:

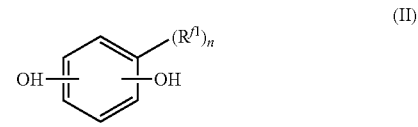

wherein n is 0 to 4, and $R^{f1}$ is a halogen, a $C_{1-10}$ hydrocarbon group, or a $C_{1-10}$ halogen-substituted hydrocarbon group;

monomer (III) is a second dihydroxy compound not the same as monomer (II) and of the formula:

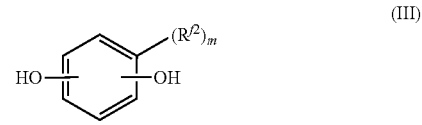

wherein m is 1 to 4, and $R^{f2}$ is a halogen, a $C_{1-10}$ hydrocarbon group, or a $C_{1-10}$ halogen-substituted hydrocarbon group; and monomer (IV) is a third dihydroxy compound of the formula:

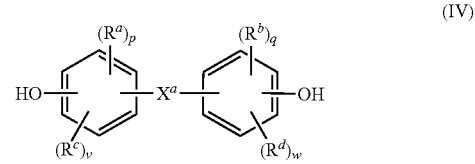

wherein $R^a$ and $R^b$ are each independently a halogen or $C_{1-12}$ alkyl group that is meta to the hydroxy group on the same aromatic ring; $R^c$ and $R^d$ each independently represent a $C_1$-$C_{12}$ alkyl group that is ortho to the hydroxy group on the same ring; p and q are each independently integers of 0 to 2; v and w are each independently integers 0 to 2; and $X^a$ is a single bond or a bridging group;

wherein
the sum of the mole percent of the repeat units derived from monomers (II) and (III) is greater than or equal to 30 mole percent, based on the total moles of the repeat units derived from monomers (II), (III), and (IV) in the first polycarbonate polymer, the mole percent of the repeat units derived from monomer (IV) is 5 to 70 mole percent, based on the total moles the repeat units derived from monomers (II), (III), and (IV), and the total wt. % of the repeat units derived from monomers (II), (III), and (IV) is greater than or equal to 80 wt. % of the first polycarbonate polymer;

the additional polycarbonate polymer comprises 50 to 100 mole percent of repeat units derived from a bisphenol cyclohexane of the formula (VI):

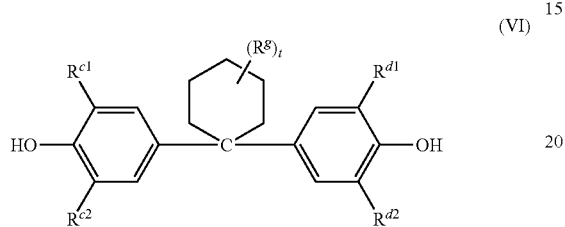

(VI)

wherein $R^{c1}$ and $R^{d1}$ are each independently $C_{1-12}$ alkyl, $R^{c2}$ and $R^{d2}$ are each independently hydrogen or $C_{1-12}$ alkyl, $R^g$ is $C_{1-12}$ alkyl or halogen, and t is 0 to 10; and 0 to 50 mole percent of repeat units derived from a dihydroxy aromatic compound of formula (VIII):

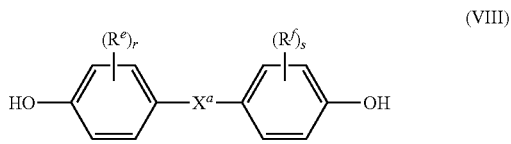

(VIII)

wherein $R^e$ and $R^f$ are each independently a halogen or $C_{1-10}$ alkyl group; r and s are each independently integers of 0 to 4; $X^a$ is a single bond or a bridging group connecting the two hydroxy-substituted aromatic groups; and the dihydroxy aromatic compound of formula (VIII) is not the same as the bisphenol cyclohexylidene of formula (VI); and a second layer in contact with the first layer, wherein the second layer comprises a second polycarbonate polymer that is not the same as the first polycarbonate polymer in the first layer.

16. The multilayer thermoplastic film of claim 1, wherein the additional polycarbonate polymer comprises 50 to 100 mole percent of repeat units derived from a bisphenol cyclohexane of the formula:

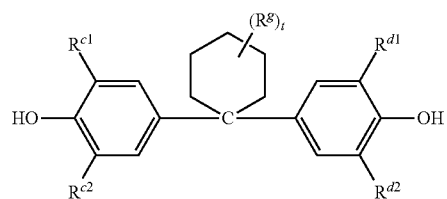

wherein $R^{c1}$ and $R^{d1}$ are each independently $C_{1-12}$ alkyl, $R^{C2}$ and $R^{d2}$ are each independently hydrogen or $C_{1-12}$ alkyl, $R^g$ is $C_{1-12}$ alkyl or halogen, and t is 0 to 10; and 0 to 50 mole percent of repeat units derived from a monomer of the formula:

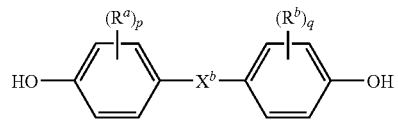

wherein $R^a$ and $R^b$ are each independently a halogen or $C_{1-10}$ alkyl group that is meta to the hydroxy group on the same aromatic ring; p and q are each independently integers of 0 to 2; and $X^b$ is a $C_{1-8}$ alkylidene bridging group of the formula —$C(R^j)(R^k)$—wherein $R^j$ and $R^k$ are each independently hydrogen or $C_{1-4}$ alkyl.

17. The multilayer thermoplastic film of claim 16, comprising 5 to 95 wt. % of the first polycarbonate polymer and 5 to 95 wt. % of the additional polycarbonate polymer, based on the total weight of first and additional polycarbonate polymers.

18. The multilayer thermoplastic film of claim 16, comprising 5 to 60 wt. % of the first polycarbonate polymer and 40 to 95 wt. % of the additional polycarbonate polymer, based on the total weight of first and additional polycarbonate polymers.

19. The multilayer thermoplastic film of claim 1, further comprising a printed marking.

20. A molded article comprising the multilayer thermoplastic film of claim 19, in combination with an injection molded polymeric base to which the film is bonded.

21. A method of molding an article, comprising placing the multilayer thermoplastic film of claim 1 into a mold, and injecting a base polymer into a mold cavity space behind the multilayer to form a single molded part comprising the multilayer film and the injection molded base resin.

22. The multilayer thermoplastic film of claim 15, wherein the film exhibits a light transmission of greater than or equal to 90%, as measured in accordance with ASTM D1003-00 for a multilayer film having a thickness of 0.32 mm.

23. The multilayer thermoplastic film of claim 15, wherein the catalyst is a phase transfer or a transesterification catalyst.

* * * * *